US011891498B2

United States Patent
Kim et al.

(10) Patent No.: US 11,891,498 B2
(45) Date of Patent: Feb. 6, 2024

(54) MOLDED ARTICLE PROVIDED WITH A RESIN PART

(71) Applicant: Furukawa Electric Co., Ltd., Tokyo (JP)

(72) Inventors: Jaekyung Kim, Tokyo (JP); Kenichi Suyama, Tokyo (JP); Yasuo Nakajima, Tokyo (JP); Eiji Kozawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 16/861,208

(22) Filed: Apr. 28, 2020

(65) Prior Publication Data

US 2020/0255630 A1 Aug. 13, 2020

Related U.S. Application Data

(63) Continuation of application No. PCT/JP2018/040431, filed on Oct. 31, 2018.

(30) Foreign Application Priority Data

| Oct. 31, 2017 | (JP) | 2017-210328 |
| Oct. 31, 2017 | (JP) | 2017-210329 |
| Oct. 31, 2017 | (JP) | 2017-210331 |
| Oct. 31, 2017 | (JP) | 2017-210332 |
| Oct. 31, 2017 | (JP) | 2017-210343 |
| May 22, 2018 | (JP) | 2018-098150 |

(51) Int. Cl.
| C08L 1/02 | (2006.01) |
| C08L 101/02 | (2006.01) |
| C08L 51/06 | (2006.01) |
| F21V 15/01 | (2006.01) |
| H01R 13/504 | (2006.01) |

(52) U.S. Cl.
CPC ............. *C08L 1/02* (2013.01); *C08L 101/025* (2013.01); *C08L 51/06* (2013.01); *F21V 15/01* (2013.01); *H01R 13/504* (2013.01)

(58) Field of Classification Search
CPC .. C08L 1/02; C08L 23/06; C08L 23/12; C08L 101/025; C08L 51/06
See application file for complete search history.

(56) References Cited

U.S. PATENT DOCUMENTS

| 3,464,952 A | 9/1969 | Larsen |
| 3,645,939 A | 2/1972 | Gaylord |
| 3,856,724 A | 12/1974 | O, Connor et al. |
| 3,962,157 A | 6/1976 | Nakano et al. |
| 4,380,522 A | 4/1983 | Georlette et al. |
| 11,746,215 B2 | 9/2023 | Kim et al. |
| 2003/0157351 A1 | 8/2003 | Swatloski et al. |
| 2004/0214925 A1 | 10/2004 | Sigworth |
| 2005/0288484 A1 | 12/2005 | Holbrey et al. |
| 2007/0141337 A1 | 6/2007 | Mehta et al. |
| 2007/0208110 A1 | 9/2007 | Sigworth et al. |
| 2008/0146701 A1 | 6/2008 | Sain et al. |
| 2008/0188636 A1 | 8/2008 | Argyropoulos et al. |
| 2010/0267942 A1 | 10/2010 | Buchanan et al. |
| 2010/0292381 A1 | 11/2010 | Kamikawa |
| 2010/0305249 A1 | 12/2010 | Buchanan et al. |
| 2011/0086948 A1 | 4/2011 | Han et al. |
| 2011/0244217 A1 | 10/2011 | Matsushita |
| 2011/0244223 A1 | 10/2011 | Matsushita |
| 2012/0041080 A1 | 2/2012 | Buchanan et al. |
| 2012/0121830 A1 | 5/2012 | Buchanan et al. |
| 2012/0214911 A1 | 8/2012 | Yano et al. |
| 2012/0225976 A1 | 9/2012 | Bampi |
| 2014/0073776 A1 | 3/2014 | Shiramizu et al. |
| 2014/0121307 A1 | 5/2014 | Cao et al. |
| 2014/0227605 A1 | 8/2014 | Nakamura et al. |
| 2014/0336309 A1* | 11/2014 | Sakata ............... C08K 7/02 524/35 |
| 2014/0343271 A1 | 11/2014 | Buchanan et al. |
| 2014/0350188 A1* | 11/2014 | Hamad ............... C08L 51/02 525/190 |
| 2015/0105499 A1 | 4/2015 | Yano et al. |
| 2015/0198301 A1 | 7/2015 | Yasuda et al. |
| 2016/0002461 A1* | 1/2016 | Tsujii ............... C08F 293/00 523/351 |
| 2016/0075877 A1 | 3/2016 | Kaiser |
| 2016/0229997 A1 | 8/2016 | Mohanty et al. |
| 2016/0289375 A1 | 10/2016 | Nakamura et al. |
| 2017/0002182 A1 | 1/2017 | Imai et al. |
| 2017/0218188 A1 | 8/2017 | Kozawa et al. |
| 2019/0023877 A1* | 1/2019 | Kozawa ............. C08K 5/3445 |
| 2019/0023882 A1 | 1/2019 | Kim et al. |
| 2019/0031858 A1* | 1/2019 | Kozawa ............. C08K 5/19 |
| 2020/0010654 A1* | 1/2020 | Kim ............... C08L 23/06 |
| 2020/0224007 A1* | 7/2020 | Kim ............... F16H 55/18 |
| 2020/0224008 A1* | 7/2020 | Kim ............... A01G 9/16 |
| 2020/0224009 A1 | 7/2020 | Kim et al. |

FOREIGN PATENT DOCUMENTS

| CN | 101896551 A | 11/2010 |
| CN | 102040831 A | 5/2011 |
| CN | 103534275 A | 1/2014 |
| CN | 104292412 A | 1/2015 |
| CN | 104334615 A | 2/2015 |
| EP | 0822223 A1 | 2/1998 |
| EP | 0897943 A2 | 2/1999 |
| EP | 2268857 A1 | 1/2011 |
| EP | 2419453 A1 | 2/2012 |
| EP | 2419454 A1 | 2/2012 |

(Continued)

OTHER PUBLICATIONS

Lewandowska et al., Journal of Raman Spectroscopy, 2016, 47, 1337-1342 (Year: 2016).*

(Continued)

*Primary Examiner* — Liam J Heincer
(74) *Attorney, Agent, or Firm* — Dorsey & Whitney LLP

(57) ABSTRACT

Examples described herein relate to a molded article provided with a resin part formed with a polyolefin resin composite material, the polyolefin resin composite material containing a polyolefin resin and 10 to 150 parts by mass of cellulose based on 100 parts by mass of the polyolefin resin, wherein an area of an aggregate of the cellulose is less than 20,000 μm².

11 Claims, 8 Drawing Sheets

(56) References Cited

FOREIGN PATENT DOCUMENTS

| | | |
|---|---|---|
| EP | 2492305 A1 | 8/2012 |
| EP | 2268857 B1 | 9/2012 |
| EP | 3216806 A1 | 9/2017 |
| EP | 3604424 A1 | 2/2020 |
| EP | 3689972 A1 | 8/2020 |
| GB | 2310213 A | 8/1997 |
| JP | S55131031 A | 10/1980 |
| JP | S58139593 A | 8/1983 |
| JP | S6239642 A | 2/1987 |
| JP | S6333448 A | 2/1988 |
| JP | H05269736 A | 10/1993 |
| JP | H08169015 A | 7/1996 |
| JP | H08267597 A | 10/1996 |
| JP | H09280345 A | 10/1997 |
| JP | H09316248 A | 12/1997 |
| JP | H101575 A | 1/1998 |
| JP | H11217468 A | 8/1999 |
| JP | 2000264974 A | 9/2000 |
| JP | 2003105100 A | 4/2003 |
| JP | 2003105203 A | 4/2003 |
| JP | 3479661 B2 | 12/2003 |
| JP | 2004293569 A | 10/2004 |
| JP | 2004320670 A | 11/2004 |
| JP | 2005187524 A | 7/2005 |
| JP | 4013870 B2 | 11/2007 |
| JP | 2008160360 A | 7/2008 |
| JP | 2008297364 A | 12/2008 |
| JP | 2009167250 A | 7/2009 |
| JP | 2010089483 A | 4/2010 |
| JP | 2011093990 A | 5/2011 |
| JP | 2011116838 A | 6/2011 |
| JP | 2011213966 A | 10/2011 |
| JP | 2011219571 A | 11/2011 |
| JP | 2012087199 A | 5/2012 |
| JP | 2012102324 A | 5/2012 |
| JP | 2012207063 A | 10/2012 |
| JP | 2012524145 A | 10/2012 |
| JP | 3180021 B2 | 11/2012 |
| JP | 3180021 U | 11/2012 |
| JP | 2012214563 A | 11/2012 |
| JP | 2012236906 A | 12/2012 |
| JP | 2013056958 A | 3/2013 |
| JP | 2013107987 A | 6/2013 |
| JP | 2013189574 A | 9/2013 |
| JP | 2013234268 A | 11/2013 |
| JP | 2013248824 A | 12/2013 |
| JP | 2014001361 A | 1/2014 |
| JP | 2014015512 A | 1/2014 |
| JP | 2014129509 A | 7/2014 |
| JP | 2014193959 A | 10/2014 |
| JP | 2015050052 A | 3/2015 |
| JP | 2015183153 A | 10/2015 |
| JP | 2015203093 A | 11/2015 |
| JP | 2015209439 A | 11/2015 |
| JP | 2016017096 A | 2/2016 |
| JP | 2016094516 A | 5/2016 |
| JP | 2017128717 B2 | 7/2017 |
| JP | 2017132988 A | 8/2017 |
| JP | 2017145392 A | 8/2017 |
| JP | 2017145393 A | 8/2017 |
| JP | 2017155248 A | 9/2017 |
| JP | 2017171698 A | 9/2017 |
| KR | 20100129293 A | 12/2010 |
| WO | 03029329 A2 | 4/2003 |
| WO | 2008069121 A1 | 6/2008 |
| WO | 2009118262 A1 | 10/2009 |
| WO | 2010120269 A1 | 10/2010 |
| WO | 2013035786 A1 | 3/2013 |
| WO | 2013133093 A1 | 9/2013 |
| WO | 2014017274 A1 | 1/2014 |
| WO | 2015039237 A1 | 3/2015 |
| WO | 2015152189 A1 | 10/2015 |
| WO | 2016063914 A1 | 4/2016 |
| WO | 2015053226 A | 3/2017 |
| WO | 2017141779 A1 | 8/2017 |
| WO | 2017170745 A1 | 10/2017 |
| WO | 2017170746 A1 | 10/2017 |
| WO | 2017170747 A1 | 10/2017 |
| WO | WO-2017165957 A1 * | 10/2017 ........... B29C 43/003 |

OTHER PUBLICATIONS

English translation of international Preliminary Report on Patentability for Application No. PCT/JP2018/040431, dated May 5, 2020.

English translation of International Search Report and Written Opinion for Application No. PCT/JP2018/040431, dated Jan. 22, 2019.

English translation of Written Opinion for Application No. PCT/JP2018/040431, dated Jan. 22, 2019.

Brintzinger, Hans H. et al., "Stereospecific Olefin Polymerization with Chiral Metallocene Catalysts", Angewandte Chemie International Edition in English, vol. 34, Issue 11, Jun. 16, 1995, 1143-1170.

Ewen, John et al., "Syndiospecific Propylene Polymerizations With Group 4 Metallocenes", Journal of the American Chemical Society, vol. 110 No. 18, Aug. 1, 1988, 6255.

Wahlström, Ronny et al., "Enzymatic Hydrolysis of Lignocellulosic Polysaccharides in the Presence of Ionic Liquids", Green Chemistry, vol. 17, Nov. 7, 2014, 694-714.

Yamashita, Shinzo et al., Handbook of Crosslinking Agent, Oct. 1981, 162.

Zambelli, A. et al., "Model Compounds and 13C NMR Observation of Stereosequences of Polypropylene", Macromolecules vol. 8 No. 5, Sep. 1, 1975, 687.

EESR dated Jun. 18, 2021 for EP Application No. 18874930.3.

OTA, English-language machine translation of JP2005187524A ("Ota"), performed on Espacenet on Apr. 20, 2021, 11 pages, 11 pages.

Suzuki, Katsuhito et al., "Development of continuous process enabling nanofibrillation of pulp and melt compounding", Cellulose, Springer Netherlands, Netherlands, vol. 20, No. 1, Feb. 1, 2013, (Feb. 1, 2013), pp. 201-210, XP036830877.

[English Translation] Decision of Rejection dated Mar. 25, 2021 for Chinese Application No. 201780017841.5.

[English Translation] First Office Action dated Aug. 26, 2020 for Chinese Application No. 201780018439.9.

[English Translation] First Office Action dated Jan. 19, 2022 for Chinese Patent Application No. 201880070847.3.

[English Translation] First Office Action dated Jun. 11, 2021 for the Chinese Patent Application No. 201880009893.2.

[English Translation] International Search Report dated Jul. 4, 2017 for PCT Application No. PCT/JP2017/013024.

[English Translation] International Search Report dated Jun. 12, 2018 for International Patent Application No. PCT/JP2018/009757.

[English Translation] International Search Report dated Jun. 27, 2017 for PCT Application No. PCT/JP2017/013022.

[English Translation] Notice of Reasons for Refusal dated Feb. 9, 2021 for Japanese Patent Application No. 2018-509368.

[English Translation] Notice of Reasons for Refusal dated Feb. 9, 2021 for Japanese Patent Application No. 2018-509370.

[English Translation] Notice of Reasons for Refusal dated Sep. 14, 2021 for Japanese Patent Application No. 2019-509210.

[English Translation] Second Office Action dated Jan. 30, 2022 for Chinese Patent Application No. 201880063825.4.

[English Translation] Second Office Action dated Jun. 3, 2021 for Chinese Patent Application No. 201780018439.9.

[English Translation] Second Office Action dated Oct. 13, 2021 for Chinese Patent Application No. 201880009893.2.

[English Translation] The First Office Action dated Jul. 3, 2020 for Chinese Application No. 201780017841.5.

[English Translation] The Second Office Action dated Dec. 10, 2020 for Chinese Application No. 201780017841.5.

Extended European Search Report dated Nov. 29, 2019 for European Patent Application No. 17775281.3.

(56) References Cited

OTHER PUBLICATIONS

Extended European Search Report dated Nov. 23, 2020 for European Patent Application No. 18776773.6.
Extended European Search Report dated Oct. 8, 2019 for European Patent Application No. EP17775279.7.
Extended European Search Report dated Sep. 15, 2020 for European Patent Application No. 20170209.9.
Non Final Office Action for U.S. Appl. No. 16/571,957, dated Oct. 26, 2021.
English-language machine translation of JP201207063, performed on Espacenet on Sep. 1, 2021,.
Satas, D. et al., "Coatings Technology Handbook (Second Edition)", China Petrochemical Press, Jan. 2003, 9 pgs.
[English Translation] Notice of Reasons for Refusal dated May 30, 2022 for Japanese Patent Application No. 2019-545198; pp. all.
Communication pursuant to Rule 114(2) EPC with annexed third party observations under Article 115 EPC dated Apr. 12, 2022 for European Patent Application No. 18860626.3.
[English Translation] Second Office Action dated Jan. 24, 2022 for Chinese Patent Application No. 201880063819.9; pp. all.
[English Translation] Second Office Action dated Jan. 29, 2022 for Chinese Patent Application No. 201880063823.5; pp. all.
[English Translation] Duan, Jiufang "Natural Polymeric Materials", Wuhan: Huazhong University of Science and Technology Press; ISBN 978-7-5680-1309-3, Jun. 2011; pp. all.
[English Translation] Wang, Guoquan "Principles and Applications of Polymer Blend Modification", Beijing: China Light Industry Press ISBN 978-7-5019-5741-5, Jul. 2007; pp. all.
Non Final Office Action issued in U.S. Appl. No. 16/144,304 dated Apr. 28, 2022; pp. all.
Non Final Office Action issued in U.S. Appl. No. 16/144,430, dated Apr. 28, 2022; pp. all.
The Editors of Encyclopaedia Britannica, "Kraft Process", Encyclopedia Britannica, Sep. 7, 2015, https://www.britannica.com/technology/kraft-process; captured Apr. 23, 2022; pp. all.
[English Translation] Notice of Submission of Publications and Reasons for Submission dated Apr. 15, 2022 for Japanese Patent Application No. 2019-545199; pp. all.
[English Translation] Second Office Action dated Jun. 7, 2022 for Chinese Patent Application No. 201880070847.3; pp. all.
[English Translation] Notice of Reasons for Refusal dated Jun. 28, 2022 for Japanese Patent Application No. 2019-550436; pp. all.
Decision of Rejection for CN Application No. 201880009893.2, dated Jan. 18, 2022; pp. all [English Translation].
Non Final Rejection Action dated Mar. 15, 2022 for U.S. Appl. No. 16/832,986, pp. all.
Non Final Rejection Action dated Mar. 15, 2022 for U.S. Appl. No. 16/833,222, pp. all.
[English Translation] Notice of Reasons for Refusal for Japanese Patent Application No. 2019-545198 dated Nov. 8, 2022, pp. all.
Notice of Reasons for Refusal dated Apr. 26, 2023 in JP Application No. 2019-550436; pp. all.
Notice of Submission of Publications and Reasons for Submission dated Mar. 14, 2023 in JP Application No. 2019-550436; pp. all.
Notice of Submission of Publications and Reasons for Submission dated Mar. 22, 2023 in JP Application No. 2019-550436; pp. all.
[English Translation] Third Office Action dated Aug. 31, 2022 for CN application No. 20188/0070847.3; pp. all.
[English Translation] Nippon Paper Group Website "Products Functional cellulose KC Flock(R) (Powdered Cellulose), NP fibers (plant fibers)" http://www.nipponpapergroup.com/products/chemical/functional_cellulose/kcflock.html, pp. all.
[English Translation] Notice of Reasons for Refusal for Japanese Patent Application No. 2019-550436 dated Dec. 13, 2022, pp. all.
[English Translation] Notice of Submission of Publication and Reasons for Submission for Japanese Patent Application No. 2019-550436 dated Dec. 1, 2022, pp. all.
Juliusz Pernak et al. "New Ionic Liquids and Their Antielectrostatic Properties" 40 Ind. Eng. Chem. Res.; published May 5, 2001; pp. 2379-2383.
[English Translation] Notice of Reasons for Refusal dated Jul. 13, 2022 for Japanese Patent Application No. 2019-545199.
[English Translation] Notice of Reasons for Refusal dated Jul. 13, 2022 for Japanese Patent Application No. 2019-545200.
[English Translation] Rejection Decision dated Jul. 1, 2022 for Chinese Patent Application No. 201880063819.9.
[English Translation] Rejection Decision dated Jul. 1, 2022 for Chinese Patent Application No. 201880063823.5.
[English Translation] Rejection Decision dated Jul. 1, 2022 for Chinese Patent Application No. 201880063825.4.
European Office Action for European Patent Application No. 18874930 dated Aug. 24, 2023, pp. all.

* cited by examiner

COMPARATIVE EXAMPLE 1

OPTICAL MICROSCROPE (X 50)

IMAGE PROCESSING (AREA MEASUREMENT)

EXAMPLE 1

OPTICAL MICROSCROPE (X 50)

IMAGE PROCESSING (AREA MEASUREMENT)

MOLDED ARTICLE PROVIDED WITH A RESIN PART

CROSS REFERENCE TO RELATED APPLICATIONS

This is a continuation application of International Patent Application No. PCT/JP2018/040431 filed Oct. 31, 2018, which claims the benefits of Japanese Patent Applications No. 2017-210328 filed Oct. 31, 2017, No. 2017-210329 filed Oct. 31, 2017, No. 2017-210331 filed Oct. 31, 2017, No. 2017-210332 filed Oct. 31, 2017, No. 2017-210343 filed Oct. 31, 2017, No. 2018-098150 filed May 22, 2018 and the full contents of all of which are hereby incorporated by reference in their entirety.

BACKGROUND

Technical Field

The present disclosure relates to a molded article, such as a lamp body of a lighting appliance, a speaker unit, a connection box, a connector, a pulley, and a film for a house, the molded article being provided with a resin part, and particularly relates to a molded article provided with a resin part prepared by injection molding, T-die molding, or the like. In particular, the present disclosure relates to a molded article, such as a lamp body of a lighting appliance, a speaker unit, a connection box, a connector, a pulley, and a film for a house, the molded article being provided with a resin part formed with a polyolefin resin composite material.

Description of the Related Art

In recent years, for the purpose of reducing fuel consumption of a vehicle, such as an automobile, further weight reduction of the vehicle has been required. To reduce the weight of a vehicle, not only the weight of a large part, such as a body forming the vehicle, but also the weights of various members, such as a lighting appliance including a headlight or the like, a speaker unit for automotive application as one component of an audio system to be loaded on the vehicle, a connection box and a connector for an automobile, and a guide pulley for a belt that drives engine accessories or the like of an automobile, need to be reduced.

The lighting appliance for a vehicle is generally provided with a lamp body including an opening, a front cover that covers the opening, an extension, a reflection mirror (reflector), a light source, electrical components, and the like. To reduce the weight of the lighting appliance for a vehicle, it is effective to form the lamp body with a resin material, the lamp body having a relatively high ratio of the weight to the total weight of the lighting appliance for a vehicle among the components of the lighting appliance for a vehicle.

In addition to further weight reduction, improvements in strength characteristics against vibration and in acoustic characteristics as a speaker unit are also required in the speaker unit for automotive application. To meet such requirements, it is desirable to form, for example, a case body (enclosure or cabinet), a frame, and the like of the speaker unit with a suitable compounded material.

The connection box and connector for an automobile is generally produced by performing injection molding using a glass fiber-reinforced thermoplastic resin composition in which a glass fiber is dispersed as a reinforcing material. The use of such a highly strong resin enables thinning and weight reduction of the connection box and the connector. On the other hand, when the connection box, the connector, and the like are produced by injection molding, runner end materials and mis-shot products are produced. In addition, connection boxes, connectors, and the like formed using a glass fiber-reinforced thermoplastic resin are collected from scrapped cars in some cases. However, deterioration in strength of a recycled glass fiber-reinforced thermoplastic resin due to recycling is significant. Therefore, when a recycled glass fiber-reinforced thermoplastic resin is used, thinning and weight reduction of a connection box, a connector, and the like are difficult from the viewpoint of retaining the strength. Thus, a fiber-reinforced material such that effects of thinning and weight reduction are not lost even if it is recycled, the fiber-reinforced material being excellent in recyclability, is desired.

In a pulley for a vehicle, a resin part is in general integrally molded along the outer periphery of a rolling bearing, and the resin part is formed by injection molding using a resin or the like containing a reinforced fiber from the viewpoint of productivity. However, in the case of the injection molding, a gate for adjusting the inlet velocity of a resin material is essential for an injection molding machine. In addition, at a part where the resin materials having flown from the gate into a metal mold join, a weld is produced to generate nonuniformity of the reinforced fiber in a circumferential direction, so that there is a possibility that unevenness in strength and size accuracy occurs. Therefore, when a pulley is produced by injection molding, the size accuracy of the outer peripheral portion, which guides a belt, in the resin part, the strength characteristics and the like to endure the tension of the belt are required. Being excellent in size accuracy is also required similarly in the lamp body.

Such weight reduction and improvements in strength characteristics of various molded members are also required in, for example, molded members, for a house for agriculture, not limited to members for a vehicle, such as an automobile. The house for agriculture is widely used for the purpose of protecting products in the house from the outside and retaining a constant environment. A transparent film using as the main raw material vinyl chloride, polyethylene, a polyethylene-vinyl acetate copolymer, polyethylene terephthalate (PET), a polyethylene-tetrafluoroethylene copolymer, or the like is mainly used as a film for a house for agriculture so that situation of the inside can be grasped to a certain extent from the outside. Further, in recent years, the scale of an agricultural house has been made large in some cases from the viewpoint such as improving productivity. In a large-scale house for agriculture, the weight of the film to be used for the house increases, making an influence on the skeleton that supports the whole house large. In addition, an area where a flying object from the outside contacts increases. Therefore, weight reduction, high modulus of elasticity, and high strength are required in a film for a house. Further, the recyclability of a material is also required in some cases from the viewpoint of efficient utilization of resources in recent years.

To meet the requirements as described above, cellulose is regarded as promising as a compounding material for the resin part which various members are provided with. Cellulose exists on the earth in a large amount and is a renewable natural resource, and therefore cellulose is suitable as a material having a high recyclability. In addition, it is known that cellulose is light in weight, the mechanical characteristics thereof are enhanced by micronizing the cellulose into a micro size, and when the micronization is allowed to progress to a nano size, cellulose becomes a material having extremely high modulus of elasticity and high strength. Further, a resin in which micronized cellulose is compounded has a more satisfactory surface smoothness as compared to a resin in which a glass fiber or a carbon fiber is compounded. Research on utilizing cellulose having such characteristics as a reinforcing material for a thermoplastic resin has been conducted, and the feasibility of the research is attracting attention.

For example, in Japanese Patent No. 4013870, a production method for obtaining a highly strong, highly rigid aliphatic polyester composition, the production method including a step of subjecting: a resin component containing an aliphatic polyester; and a fiber component containing pulp and/or a cellulose-based fiber on which a particular pre-treatment is performed to a melt-kneading treatment in the presence of a cellulose amorphous region-swelling agent is described.

Cellulose is highly hydrophilic and therefore, when mixed with a highly hydrophilic resin, easily admixes with the highly hydrophilic resin, so that it is considered that a composite material in which cellulose is uniformly dispersed in a resin is easy to prepare. On the other hand, the affinity of cellulose to a highly hydrophobic resin, such as a polyolefin resin, is poor, and therefore even if a polyolefin resin and cellulose are melt-kneaded, a relatively large aggregate of cellulose is produced. Therefore, even if a polyolefin resin and cellulose are melt-kneaded, it has been difficult to obtain a resin composite material of uniform dispersion, in which a resin-modifying action of cellulose has sufficiently been brought out.

In addition, even though the above-described method is used, the mechanical strength of a molded body is improved due to the reinforcement effect of cellulose, but further improvements in the mechanical strength are desired.

SUMMARY

The present disclosure is related to providing a molded article provided with a resin part formed using a polyolefin resin composite material in which the size of an aggregate of cellulose is sufficiently small, and a highly hydrophobic polyolefin resin and the cellulose are integrated with a high degree of uniformity, the resin part having an improved mechanical strength.

According to an aspect of the present disclosure, a molded article includes a resin part formed with a polyolefin resin composite material, the polyolefin resin composite material including:

a polyolefin resin; and 10 to 150 parts by mass of cellulose based on 100 parts by mass of the polyolefin resin, wherein an area of an aggregate of the cellulose is less than 20,000 $\mu m^2$.

Further, it is preferable that the cellulose is a plant-derived, fibrous cellulose.

Further, it is preferable that the polyolefin resin is at least one of a polyethylene resin, a polypropylene resin, and an acrylonitrile/butadiene/styrene copolymer resin.

Further, it is preferable that the molded article is a lamp body of a lighting appliance, a speaker unit, a connection box, a connector, a pulley, or a film for a house.

According to the present disclosure, the size of an aggregate of cellulose, to be produced in a composite material, can sufficiently be made small, and a molded article provided with a resin part having an improved mechanical strength can be provided using a polyolefin resin composite material in which a polyolefin resin and cellulose are integrated with a high uniformity.

DETAILED DESCRIPTION (Polyolefin Resin Composite Material)

Figure 1:
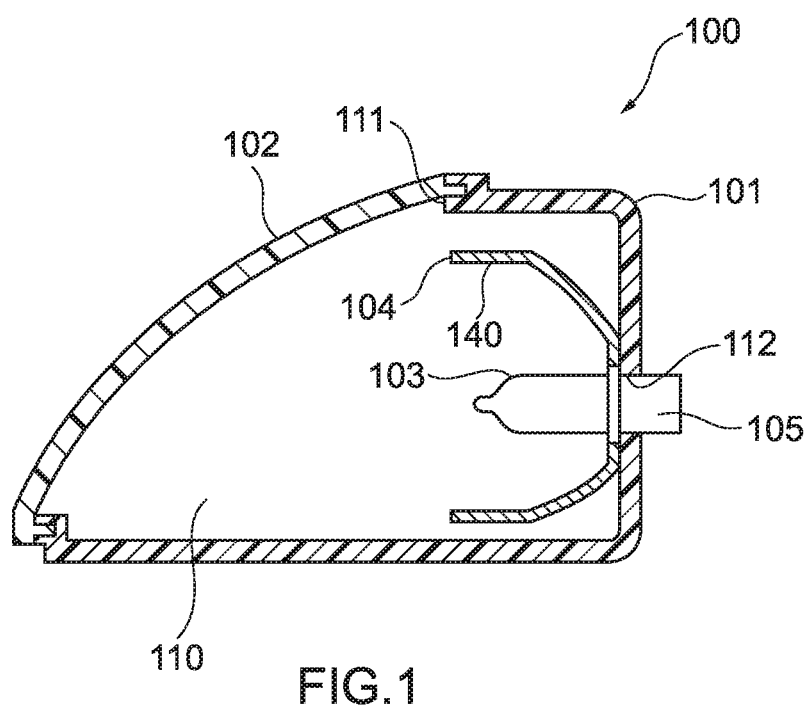
FIG. 1 is a schematic sectional diagram showing an example of a lamp body of a lighting appliance according to an embodiment of a molded article of the present disclosure.

A molded article according to the present disclosure is provided with a resin part formed with a polyolefin resin composite material, the polyolefin resin composite material containing: a polyolefin resin; and 10 to 150 parts by mass of cellulose based on 100 parts by mass of the polyolefin resin, wherein an area of an aggregate of the cellulose is less than 20,000 $\mu m^2$.

According to the present disclosure, the size of an aggregate of the cellulose, which is produced in a resultant polyolefin resin composite material, can be made sufficiently by allowing a predetermined amount of water to co-exist when a polyolefin resin and cellulose are melt-kneaded in a predetermined ratio, and further, a highly hydrophobic polyolefin and water act on a polyolefin in the melt-kneading while interacting with the cellulose, making it possible to integrate the polyolefin resin and the cellulose while highly enhancing the uniformity of the polyolefin resin and the cellulose. As a result, a molded article provided with a resin part formed using the polyolefin resin composite material, the resin part having an improved mechanical strength, can be obtained. Therefore, a step of micronizing a cellulose fiber in advance is made unnecessary, so that significant reduction in production costs can be expected. Besides, modulus of elongation increases due to the micronized cellulose fiber, and therefore efficiency of strengthening of a molded article, such as, for example, a lamp body of a lighting appliance, a speaker unit, a connection box, a connector, a pulley, and a film for a house, can be enhanced.

In this way, the present disclosure enables more efficiently providing a molded article provided with a resin part formed using a micronized cellulose fiber, so that significant reduction in production costs can be expected. Moreover, in the present disclosure, the polyolefin resin composite material in which a polyolefin resin and cellulose are integrated with a high uniformity is used, and therefore realization of molded articles, such as a pulley and a lamp body of a lighting appliance each being excellent in size accuracy, a speaker unit being excellent in acoustic characteristics, a connection box, a connector, and a film for a house each being excellent in recyclability, which are reduced in weight and highly strengthened, is enabled.

Hereinafter, components to be used in the polyolefin resin composite material of the present disclosure will be described.

—Polyolefin Resin—

The polyolefin resin is a resin obtained by polymerizing at least one olefin and may be a homopolymer or a copolymer. In the present disclosure, an olefin is used in a broad sense. That is, the olefin includes, in addition to an unsubstituted hydrocarbon compound having a carbon-carbon double bond, a case where the hydrocarbon compound having a carbon-carbon double bond further has a substituent. Examples of such an olefin include α-olefins having 4 to 12 carbon atoms, including ethylene, propylene, isobutylene, and isobutene (1-butene), butadiene, isoprene, a (meth)acrylate, (meth)acrylic acid, (meth)acrylamide, vinyl alcohol, vinyl acetate, vinyl chloride, styrene, and acrylonitrile.

Examples of the α-olefins having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene and 1-dodecene.

Examples of the polyolefin resin include vinyl resins such as a polyethylene resin, a polypropylene resin, a polyisobutylene resin, a polyisobutene resin, a polyisoprene resin, a polybutadiene resin, a (meth)acrylic resin (so-called acrylic resin), and a polyvinyl chloride resin, a poly(meth)acrylamide resin, a polystyrene resin, an acrylonitrile/butadiene/styrene copolymer resin (ABS resin), an ethylene/(meth)acrylate copolymer, and an ethylene/vinyl acetate copolymer. It is to be noted that if a resin that exhibits hydrophilicity is used as the polyolefin resin, adjustment can be done such that the whole polyolefin resin exhibits hydrophobicity by using another resin that exhibits hydrophobicity.

Among these resins, it is preferable that the polyolefin resin be at least one of a polyethylene resin, a polypropylene resin, and an acrylonitrile/butadiene/styrene copolymer resin (ABS resin), more preferably a polyethylene resin, or a polypropylene resin.

Examples of the polyethylene resin include an ethylene homopolymer and an ethylene-α-olefin copolymer. As the α-olefin, 1-butene, 1-pentene, 1-hexene, and 1-octene are preferable.

Examples of the ethylene-α-olefin copolymer include an ethylene-1-butene copolymer, an ethylene-1-pentene copolymer, an ethylene-1-hexene copolymer, and an ethylene-1-octene copolymer.

When the polyethylene resin is classified according to the density or the shape, polyethylene may be any of high density polyethylene (HDPE), low density polyethylene (LDPE), very low density polyethylene (VLDPE), linear low density polyethylene (LLDPE), and ultra high molecular weight-polyethylene (UHMW-PE).

Examples of the polypropylene resin include a propylene homopolymer, a propylene-ethylene random copolymer, a propylene-α-olefin random copolymer, a propylene-ethylene-α-olefin copolymer, and a propylene block copolymer (copolymer obtained by copolymerizing: a propylene homopolymer component or a copolymer component mainly having a constitutional unit of propylene; at least one of monomers selected from ethylene and α-olefins; and propylene). These polypropylene resins may be used singly, or two or more thereof may be used together.

As the α-olefin to be used for the polypropylene resin, 1-butene, 1-pentene, 1-hexene, 4-methyl-1-pentene, 1-octene, 1-decene are preferable, more preferably 1-butene, 1-hexene, and 1-octene.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the propylene block copolymer include a (propylene)-(propylene-ethylene) copolymer, (propylene)-(propylene-ethylene-1-butene) copolymer, (propylene)-(propylene-ethylene-1-hexene) copolymer, (propylene)-(propylene-1-butene) copolymer, (propylene)-(propylene-1-hexene) copolymer, (propylene-ethylene)-(propylene-ethylene) copolymer, (propylene-ethylene)-(propylene-ethylene-1-butene) copolymer, (propylene-ethylene)-(propylene-ethylene-1-hexene) copolymer, (propylene-ethylene)-(propylene-1-butene) copolymer, (propylene-ethylene)-(propylene-1-hexene) copolymer, (propylene-1-butene)-(propylene-ethylene) copolymer, (propylene-1-butene)-(propylene-ethylene-1-butene) copolymer, (propylene-1-butene)-(propylene-ethylene-1-hexene) copolymer, a (propylene-1-butene)-(propylene-1-butene) copolymer, and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer and a propylene block copolymer are preferable.

The crystallinity of a polypropylene resin can be determined from the melting temperature (melting point) or stereoregularity, and is adjusted according to the product quality required in the polyolefin resin composite material or the product quality required in a molded article obtained by molding the polyolefin resin composition of the present disclosure. It is to be noted that the stereoregularity is called an isotactic index or a syndiotactic index.

The isotactic index is determined by the $^{13}$C-NMR method described in Macromolecules, vol. 8, p. 687 (1975). Specifically, the isotactic index of a polypropylene resin is determined as an area fraction of an mmmm peak in all the absorption peaks in the carbon region of a methyl group in a $^{13}$C-NMR spectrum. A polypropylene resin having a high isotactic index has a high crystallinity, and it is preferable that the isotactic index be 0.96 or more, more preferably 0.97 or more, and still more preferably 0.98 or more.

The syndiotactic index is determined by the method described in J. Am. Chem. Soc., 110, 6255 (1988) or Angew. Chem. Int. Ed. Engl., 1955, 34, 1143-1170, and a polypropylene resin having a high syndiotactic index has a high crystallinity.

The polyolefin resin may be a modified polyolefin resin, and in addition, may contain a modified polyolefin resin in addition to an unmodified polyolefin resin. Examples of the modified polyolefin resin include a polyolefin resin graft-modified with an unsaturated carboxylic acid or a derivative thereof. Examples of the unsaturated carboxylic acid include maleic acid, fumaric acid, itaconic acid, acrylic acid, and methacrylic acid, and examples of the unsaturated carboxylic acid derivative include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester, and fumaric acid dimethyl ester. Among these unsaturated carboxylic acids and/or derivatives thereof, the unsaturated carboxylic acid or the derivative thereof is preferably acrylic acid, glycidyl ester of methacrylic acid, or maleic anhydride.

Examples of the acrylic resin include: a homopolymer or copolymer of acrylic monomer or monomers, such as (meth)acrylic acid, (meth)acrylic acid esters, and acrylonitrile; and a copolymer of an acrylic monomer and another monomer or other monomers. Among these, examples of the (meth)acrylic acid esters include: (meth)acrylic acid alkyl esters each having a C1 to 10 alkyl group, such as methyl (meth)acrylate, ethyl (meth)acrylate, propyl (meth)acrylate, butyl (meth)acrylate, and 2-ethylhexyl (meth)acrylate; hydroxyalkyl (meth)acrylates such as hydroxyethyl (meth)acrylate; and (meth)acrylic acid glycidyl ester.

Specific examples of the homopolymer or copolymer of acrylic monomer or monomers include a poly(meth)acrylic acid ester, an acrylic acid ester-methacrylic acid ester copolymer, and polyacrylonitrile. Specific examples of the copolymer of an acrylic monomer and another monomer or other monomers include a (meth)acrylic acid ester-styrene copolymer, a (meth)acrylic acid-styrene copolymer, an acrylonitrile-styrene copolymer, and an acrylonitrile-styrene-(meth) acrylic acid ester copolymer.

Examples of the vinyl resin include vinyl chloride resins [such as homopolymers of a vinyl chloride monomer (such as a polyvinyl chloride resin) and copolymers of a vinyl chloride monomer and another monomer (such as a vinyl chloride-vinyl acetate copolymer and a vinyl chloride-(meth)acrylate copolymer)], vinyl alcohol resins (including homopolymers such as polyvinyl alcohol, copolymers such as an ethylene-vinyl alcohol copolymer, and the like), and polyvinyl acetal resins such as polyvinyl formal. These vinyl-based resins can be used singly or by combining two or more thereof.

The melt flow rate (MFR) of the polyolefin resin is usually 0.01 to 400 g/10 min and is preferably 0.1 to 400 g/10 min, more preferably 0.5 to 200 g/10 min from the viewpoint of enhancing mechanical strength and production stability. It is to be noted that the MFR refers to the mass (g/10 min) of a polymer that flows out per 10 minutes at 190° C. under a load of 2.16 kg in accordance with JIS K7210, unless otherwise noted.

—Cellulose—

It is preferable that the cellulose to be used in the present disclosure be easily available, plant-derived fibrous cellulose the industrial utilization method of which is established, especially plant-derived, micro-fibrous cellulose. In the molded article of the present disclosure, such as, for example, a lamp body of a lighting appliance, a speaker unit, a connection box, a connector, a pulley, and a film for a house, the cellulose is used as a compounding material for a resin part, and therefore, weight reduction and high strengthening can be achieved. In addition, recyclability of the molded article can also be improved. Further, for example, when the embodiment of the molded article is like a film, a film for a house, as a molded article, can possess an improved surface smoothness by including a layer of the polyolefin resins in which such fibrous cellulose is composited, and a film for a house possessing an excellent light permeability can thereby be obtained. In addition, cellulose is a polar molecule having an —OH group, and the affinity between molecules is therefore high. Thus, a film for a house excellent in adhesion performance can be obtained because the interfacial adhesive force of the film for a house is improved. Thereby, an advantageous point, such as, for example, that the film for a house, when broken, can simply be repaired with an adhesive tape or the like, is obtained.

Pulp is a raw material for paper and contains as the main component a tracheid which is extracted from a plant. From the chemical viewpoint, the main component of pulp is a polysaccharide, and the main component of the polysaccharide is cellulose. The plant-derived fibrous cellulose is not particularly limited, and examples thereof include plant-derived cellulose such as wood, bamboo, hemp, jute, kenaf, harvest losses of farm products (for example, straw of wheat, rice, or the like, maize, stems of raw cotton or the like, sugarcane), cloth, regenerated pulp, old paper, and wood flour; however, in the present disclosure, wood or wood-derived fibrous cellulose is preferable, and the plant-derived fibrous cellulose is more preferably wood flour, particularly preferably craft pulp. It is to be noted that the craft pulp is a general term of pulp obtained by removing lignin/hemicellulose from wood or a plant raw material by a chemical treatment with caustic soda or the like to take out cellulose that is almost pure.

By melt-kneading such cellulose with a polyolefin resin in the co-existence of water, formation of aggregates of the cellulose, having an area of 20,000 $\mu m^2$ or more, can be suppressed, and highly uniform dispersion of the cellulose in the polyolefin resin composite material can be realized. It is to be noted that it is preferable that the upper limit of the area of an aggregate of cellulose be 14,000 $\mu m^2$ or less. In addition, it is preferable that the lower limit of the area of an aggregate of cellulose be 500 $\mu m^2$ or more. That the area of an aggregate of cellulose is small shows that the cellulose fiber is dispersed in a highly uniform manner without aggregation and means that an efficiency of reinforcing a polyolefin resin is high.

In the plant-derived fibrous cellulose, 30 to 40 molecules make a bundle and form a microfibril having an ultrathin width of a diameter of about 3 nm and a length of several hundred nm to several tens μm and having a high crystallinity, and such microfibrils form a structure in which these are made into a bundle through soft amorphous portions. Powdered cellulose to be used as a raw material in the present disclosure is an aggregate of these bundles.

In the present disclosure, the content of the cellulose is 10 to 150 parts by mass based on 100 parts by mass of the polyolefin resin in the polyolefin resin composite material. When the content of the cellulose is less than 10 parts by mass, it is difficult to sufficiently obtain an action of modifying the polyolefin resin by cellulose. Conversely, when the content of the cellulose exceeds 150 parts by mass, an aggregate of the cellulose, having an area of 20,000 $\mu m^2$ or more, is formed. The area of the aggregate of cellulose can be measured through an image in a visual field of, for example, an electron microscope or a microscope for industrial use, and is specifically determined by the method described in Examples. Therefore, the area of the aggregate of cellulose corresponds to, for example, a cross-sectional area, and a surface area is not included in the area.

—Additional Component—

The polyolefin resin composite material can contain, in addition to those described above, an additional component, such as an antioxidizing agent, a light stabilizer, a radical scavenger, an ultraviolet ray absorber, a colorant (dye, organic pigment, inorganic pigment), a filler, a lubricant, a plasticizer, a processing aid such as an acrylic processing aid, a foaming agent, a lubricating agent such as paraffin wax, a surface treatment agent, a crystal nucleating agent, a mold-releasing agent, a hydrolysis-preventing agent, an antiblocking agent, an antistatic agent, an antifogging agent, an antifungal agent, an ion-trapping agent, a flame retardant, and a flame retardant auxiliary, within a range where the above-described object is not impaired.

Examples of the antioxidizing agent include a phenol-based antioxidizing agent, a phosphorus-based antioxidizing agent, a sulfur-based antioxidizing agent, a hydroxylamine-based antioxidizing agent, and an amine-based antioxidizing agent, and as the phenol-based antioxidizing agent, a hindered phenol-based compound having a t-alkyl group at an ortho position is preferable.

Examples of the phenol-based antioxidizing agent include tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethylene glycol-N-bis-3-(3-t-butyl-5-methyl-4-hydroxyphenyl)propionate, 1,6-hexanediolbis[3-(3,5-di-t-butyl-4-hydroxyphenyl)propionate], 2,2-thiobis-diethylenebis[3-(3,5-di-t-butyl-4-hydroxyphenyl)propionate], lauryl-3,5-t-butyl-4-hydroxybenzoate, palmityl-3,5-t-butyl-4-hydroxybenzoate, stearyl-3,5-t-butyl-4-hydroxybenzoate, behenyl-3,5-t-butyl-4-hydroxybenzoate, 2,4-di-t-butyl-phenyl-3,5-di-t-butyl-4-hydroxybenzoate, and tocopherols, and the phenol-based antioxidizing agent is preferably 3,9-bis[2-(3-(3-t-butyl-4-hydroxy-5-methylphenyl)propionyloxy)-1,1-dimethyl-ethyl]-2,4,8,10-tetraoxaspiro[5.5]undecane, lauryl-3,5-t-butyl-4-hydroxybenzoate, palmityl-3,5-t-butyl-4-hydroxybenzoate, stearyl-3,5-t-butyl-4-hydroxybenzoate, behenyl-3,5-t-butyl-4-hydroxybenzoate, 2,4-di-t-butyl-phenyl-3,5-di-t-butyl-4-hydroxybenzoate, or tocopherols.

Examples of the phosphorus-based antioxidizing agent include tris(nonylphenyl) phosphite, tris(2,4-di-t-butylphenyl) phosphite, distearyl pentaerythritol diphosphite, bis(2,4-di-t-butylphenyl) pentaerythritol diphosphite, bis(2,4-di-t-butyl-6-methylphenyl) pentaerythritol diphosphite, bis(2,6-di-t-butyl-4-methylphenyl) pentaerythritol diphosphite, bis (2,4-dicumylphenyl) pentaerythritol diphosphite, tetrakis(2,4-di-t-butylphenyl)-4,4'-diphenylene diphosphonite, 2,2'-methylenebis(4,6-di-t-butylpheny) 2-ethylhexyl phosphite, 2,2'-ethylidenebis(4,6-di-t-butylphenyl) fluorophosphite, bis (2,4-di-t-butyl-6-methylphenyl) ethyl phosphite, 2-(2,4,6-tri-t-butylphenyl)-5-ethyl-5-butyl-1,3,2-oxaphosphorinane, 2,2,2'-nitrilo[triethyl-tris(3,3',5,5'-tetra-t-butyl-1,1'-biphenyl-2,2'-diyl) phosphite, and 2,4,8,10-tetra-t-butyl-6-[3-(3-methyl-4-hydroxy-5-t-butylphenyl)propoxy]dibenzo[d,f][1,3,2] dioxaphosphepin.

Examples of the sulfur-based antioxidizing agent include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and bis[2-methyl-4-(3-n-alkyl (alkyl having 12 to 14 carbon atoms) thiopropionyloxy)-5-t-butylphenyl] sulfide.

Examples of the light stabilizer include a hindered amine light stabilizer (light stabilizer having a 2,2,6,6-tetramethylpiperidine skeleton in a molecule) having a molecular weight of 1000 or more.

Examples of the ultraviolet ray absorber include a benzotriazole-based compound, a triazine-based compound, a benzophenone-based compound, a salicylate-based compound, a cyanoacrylate-based compound, and a nickel-based compound.

Examples of the colorant include carbon black, an inorganic pigment, and an organic pigment. Examples of the carbon black include furnace black, channel black, acetylene black, and lamp black. Examples of the inorganic pigment include iron black, red iron oxide, titanium oxide, cadmium red, cadmium yellow, ultramarine blue, cobalt blue, titanium yellow, red lead, yellow lead, and Prussian blue. Examples of the organic pigment include quinacridone, polyazo yellow, anthraquinone yellow, polyazo red, azo lake yellow, perylene, phthalocyanine green, phthalocyanine blue, and isoindolinone yellow. These colorants may be used singly, or two or more thereof may be used together.

Preferred examples of the filler include a metal compound such as silica, hydroxyapatite, alumina, titania, boehmite, talc, or calcium carbonate.

(Method for Producing Polyolefin Resin Composite Material)

The method for producing a polyolefin resin composite material suppresses the formation of an aggregate of cellulose, having an area of 20,000 $\mu m^2$ or more, by melt-kneading 100 parts by mass of a polyolefin resin, 10 to 150 parts by mass of cellulose, and water, and a polyolefin resin composite material in which the cellulose is uniformly dispersed can be obtained. It is preferable that the amount of water to be compounded be 1 to 225 parts by mass based on 100 parts by mass of the polyolefin resin because when the amount of water to be compounded is too small, dispersibility of the cellulose is made poor, and when the amount of water to be compounded is too large, difficulty in processability arises.

In addition, it is preferable in the method for producing a polyolefin resin composite material that the ratio of the content of the cellulose to the content of water (the content of the cellulose: the content of water) be 1:0.01 to 10, more preferably 1:0.1 to 5 for the purpose of improving the dispersibility of the cellulose. When the amount of water to be compounded is too small, the dispersibility of the cellulose is made poor, and when the amount of water to be compounded is too large, difficulty in processability arises.

In the method for producing a polyolefin resin composite material, the order of melt-kneading the polyolefin resin, the cellulose, and water is not particularly limited. After the polyolefin resin and the cellulose are melt-kneaded in advance, water may be added to further knead a resultant mixture, or after all of the polyolefin resin, the cellulose, and water are loaded in a processing machine, a resultant mixture may be melt-kneaded. In addition, after the cellulose and water are kneaded, the polyolefin resin may be added to further melt-knead a resultant mixture. In this processing-by-kneading step, it is preferable to perform kneading in a processing machine at a stage of performing processing and molding by extrusion, injection, or the like.

The polyolefin resin is highly hydrophobic, and when water is added in melt-kneading the polyolefin resin, the resin slides, or by other reasons causing difficulty in uniform kneading as a target in some cases. Accordingly, water is not added usually in melt-kneading a polyolefin. In contrast, a predetermined amount of water is added in melt-kneading the polyolefin resin in the method for producing a polyolefin resin composite material to be used in the present disclosure, thereby suppressing the formation of an aggregate of the cellulose, having an area of 20,000 $\mu m^2$ or more. The reason for this is uncertain, but it is inferred that a moderate amount of water added in the melt-kneading swells the cellulose to facilitate micronization of the cellulose, and this micronized cellulose is integrated with water to act on the polyolefin, enabling uniformly melt-kneading the polyolefin resin and the cellulose.

With respect to the kneading temperature, it is desirable that the temperature at which thermal decomposition of the cellulose occurs little be set to the upper limit. Accordingly, it is preferable that the upper limit temperature be 300° C. or less, more preferably 250° C. or less, and still more preferably 230° C. or less. It is practical that the lower limit is higher than the melting point of the polyolefin resin by 10° C. or more. With respect to stirring in the kneading, it is preferable to assemble a screw configuration that can secure sufficient kneadability by disposing a kneading disk appropriately in a screw shaft direction, or by other methods, and to perform kneading at a number of rotations of a screw (usually, in a range of about 100 to about 300 rpm) capable of obtaining necessary production quantity. As the apparatus for performing processing-by-kneading, an apparatus of a same direction twin-screw system is preferable, and examples thereof include a twin-screw extruder [KZW15TW-45MG-NH (trade name) manufactured by TECHNOVEL CORPORATION]. However, the apparatus for performing processing-by-kneading is not limited to the same direction twin-screw extruder and may be of any system, such as a single-screw extruder, a different direction twin-screw extruder, multi-screw extruder of triple-screw or more, a batch type kneader (such as a kneader and a Banbury), as long as a sufficient kneadability is obtained and the effects which are the same as the effects of the present disclosure are obtained.

<<Molded Article and Method for Producing Molded Article>>

The resin part of the molded article according to the present disclosure is formed with a polyolefin resin composite material containing a polyolefin resin and 10 to 150 parts by mass of cellulose based on 100 parts by mass of the polyolefin resin, wherein the area of an aggregate of the cellulose is less than 20,000 $\mu m^2$, and is particularly molded using a polyolefin resin composite material produced by the method for producing a polyolefin resin composite material. The molded article of the present disclosure is, for example, a lamp body of a lighting appliance, a speaker unit, a connection box, a connector, a pulley, or a film for a house. When the molded article is a film for a house, the film for a house includes a layer formed with the polyolefin resin composite material.

<Lamp Body of Lighting Appliance>

FIG. 1 is a schematic sectional diagram showing an example of a lamp body of a lighting appliance according to an embodiment of the molded article. In FIG. 1, a configuration of a headlight (headlamp) as a lighting appliance for a vehicle is shown as an example of a lighting appliance 100. The lighting appliance 100 includes a lamp body 101, a front cover 102, a light source 103, a reflection mirror (reflector) 104, and a socket part 105. The lamp body 101 includes an opening 111 at the front. The front cover 102 is attached to the lamp body 101 in such a way as to cover the opening 111 of the lamp body 101. Thereby, a space 110 closed up tightly by the lamp body 101 and the front cover 102 is formed.

The light source 103 and the reflection mirror 104 are disposed in the space 110. The light source 103 is, for example, a LED light bulb or a halogen light bulb. The light source 103 is connected to the socket part 105 fixed in a through hole 112 formed in the lamp body 101 and emits light by electric power supplied from the socket part 105.

The reflection mirror 104 includes a concave surface 140 dented toward the front cover 102. A hole is formed at the central part of the reflection mirror 104, and the light source 103 is inserted and fixed in the hole. The reflection mirror 104 reflects the light emitted from the light source 103 by the concave surface 140 to lead the light on the side of the front cover 102.

The front cover 102 is formed from a light (visible light)-transmittable resin material. The front cover 102 also functions as a lens that condenses or diffuses light from the light source 103.

The lamp body 101 herein is provided with a resin part formed with the above-described polyolefin resin composite material. Thereby, weight reduction and high strengthening of the lamp body 101 can be achieved, and the recyclability and the surface smoothness can be improved.

The method of producing the lamp body 101 is not particularly limited, and the lamp body 101 can be molded by injection molding of injecting the polyolefin resin composite material into a metal mold. Thereby, the resistance against wear of a metal mold is improved, and a metal mold is made difficult to corrode.

FIG. 1 shows an example of a case where the whole of the lamp body 101 is formed by the resin part, but the lamp body 101 is not limited to this and may include the resin part and a part formed with a material other than a resin. In addition, FIG. 1 shows an example of a case where the lighting appliance 100 is a headlight; however, the lighting appliance 100 is not limited to this, and the lamp body 101 can be applied as a lamp body of a lighting appliance for a vehicle, such as a brake lamp, a fog lamp, and a reversing light. Further, the lamp body 101 can be applied as a body part (housing) of various lighting appliances, not limited to the lighting appliance for a vehicle.

<Speaker Unit>

Figure 2:
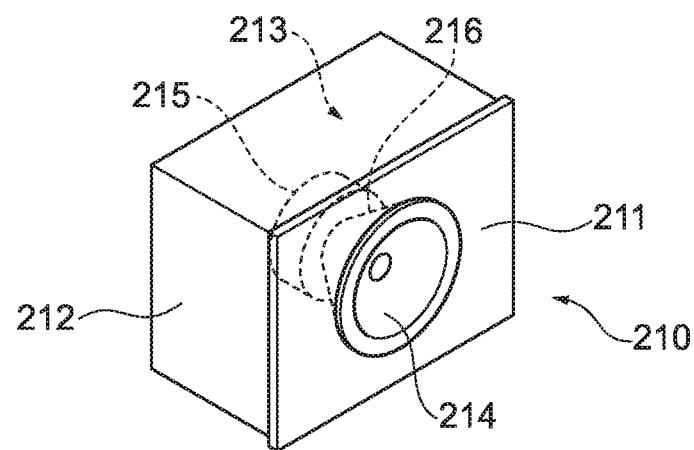
FIG. 2 is a perspective diagram showing an example of a speaker unit according to an embodiment of a molded article of the present disclosure.

FIG. 2 is a perspective diagram showing an example of a speaker unit according to an embodiment of the molded article. A speaker unit 210 is provided with: an almost tightly-closed case body (enclosure) 213 formed by a board-like baffle 211 and a box-like storing part 212 bonded to the back of the baffle 211; and a speaker 214 held by the case body 213 in such a way as to expose a sound-emitting surface to the surface of the baffle 211. It is to be noted that the case body (enclosure) 213 is also generally called a speaker box or a cabinet and has various shapes, such as a box type, a cylindrical type, and a conical type, depending on an apparatus or the like to which the case body 213 is applied. The speaker 214 includes: an exciter 215 as a source of vibration for a magnetic circuit; and cone paper 216 that releases a sound wave generated by the vibration of the exciter 215 outside the case body 213.

Figure 3:
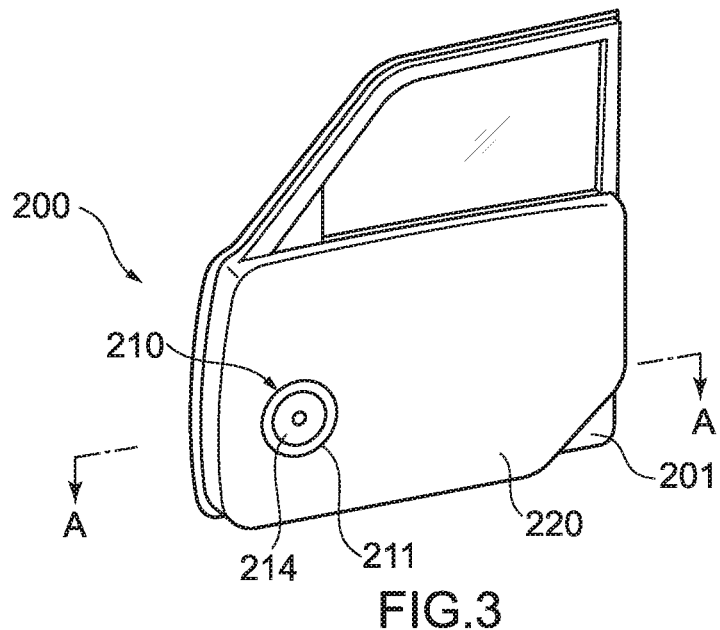
FIG. 3 is a perspective diagram showing an aspect of applying a speaker unit according to an embodiment of a molded article of the present disclosure to a speaker apparatus for automotive application.
Figure 4:
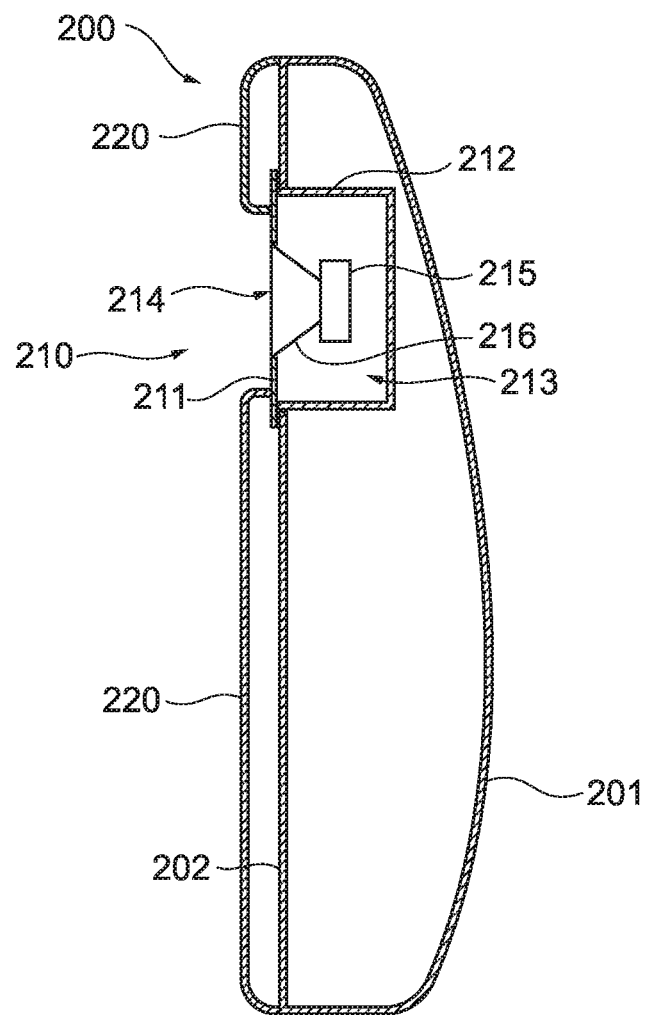
FIG. 4 is a sectional diagram of the speaker apparatus for automotive application shown in FIG. 3, the sectional diagram viewed from the arrow direction along the line A-A in FIG. 3.

FIG. 3 is a perspective diagram showing a speaker apparatus 200 for automotive application, which is an embodiment of applying the speaker unit to a speaker apparatus for automotive application. FIG. 4 is a sectional diagram of the speaker apparatus 200 for automotive application shown in FIG. 3, the sectional diagram viewed from the arrow direction along the line A-A in FIG. 3. As shown in FIGS. 3 and 4, the speaker unit 210 to be used as the speaker apparatus 200 for automotive application is provided between an outer panel 201 on the vehicle outer side and an inner panel 202 on the vehicle inner side, the panels forming a door in a vehicle, such as an automobile, and is attached in a state where the speaker unit 210 is exposed from the opening of the inner panel 202. It is to be noted that to the inner panel 202, an inner trim 220 covering the surface of the inner panel 202 is attached in a state of exposing the speaker unit 210.

In the speaker unit 210 used for the speaker apparatus 200 for automotive application shown in FIGS. 2 to 4, the above-described polyolefin resin composite material is used for the baffle 211, the storing part 212, and the cone paper 216 of the case body 213. Thereby, weight reduction and improvements in strength characteristics and acoustic characteristics can be achieved in the speaker apparatus 200 for automotive application. The speaker unit 210 in particular can contribute to reducing fuel consumption of a vehicle due to the weight reduction and is made highly strong, and therefore vibration of the case body 213 caused by vibration of a vehicle can be suppressed. As a result, noise attributable to the vibration of the case body 213 can be reduced and the acoustic characteristics can be improved. In addition, the above-described polyolefin resin composite material is used for the speaker unit 210, and therefore the speaker unit 210 exhibits an excellent whitening resistance. Further, the speaker unit 210 includes a case body 213 formed with the polyolefin resin composite material and therefore is rich in recyclability and surface smoothness.

The object of applying the speaker unit is not limited to an automobile, and examples thereof include mobile objects such as a two-wheeled vehicle, a railroad vehicle, a plane, and a ship, a computer apparatus, a headphone, or all the speaker apparatuses to be installed for home-use.

<Connection Box and Connector>

Figure 5:
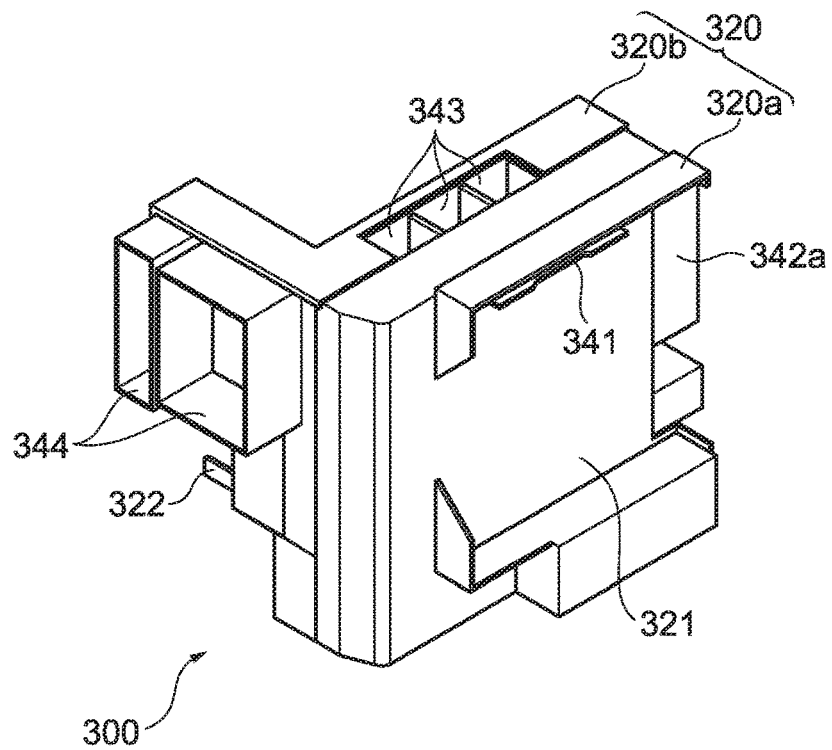
FIG. 5 is a perspective diagram showing an example of a connection box according to an embodiment of a molded article of the present disclosure.
Figure 6:
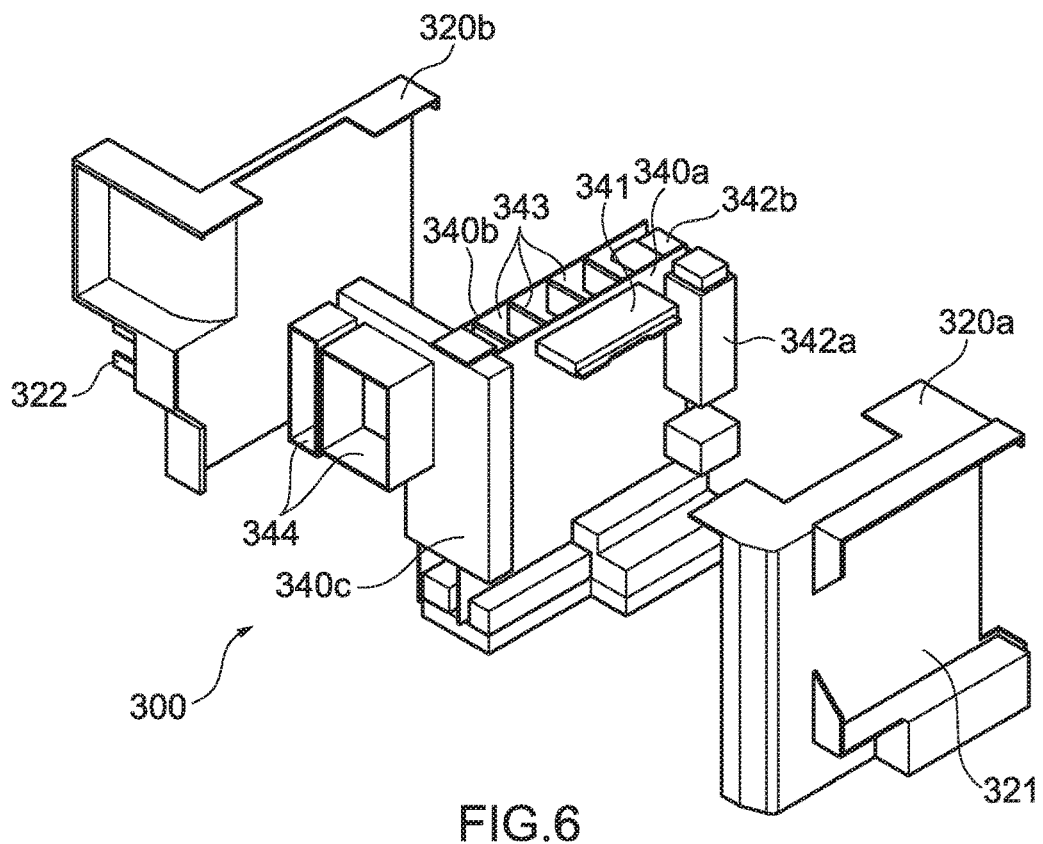
FIG. 6 is a disassembled perspective diagram of the connection box shown in FIG. 5.

FIG. 5 is a perspective diagram showing a connection box according to an embodiment of the molded article. FIG. 6 is a disassembled perspective diagram of the connection box shown in FIG. 5. A connection box 300 is formed, for example, as a junction box to be installed on the indoor side of an automobile. This connection box 300 is provided with a case 320 including a first case 320a and a second case 320b.

The connection box 300 is provided with a first substrate 340a, a second substrate 340b, and a third substrate 340c in the accommodating space inside thereof. The first substrate 340a and the second substrate 340b are disposed in such a way as to be in parallel with each other, and the third substrate 340c is disposed in such a way as to be vertically connected to end portions of the first substrate 340a and the second substrate 340b.

On a mounting surface 321 of the first case 320a, an electronic control unit (ECU: Electronic Control Unit) not shown in the figures is to be installed. A connector 341 for ECU of the first substrate 340a is disposed in such a way as to protrude from the mounting surface 321 and can electrically connect the circuit of the first substrate 340a to ECU.

From the end portion of the second case 320b, a connector 322 for mounting a relay, the connector integrated with the case 320 of the connection box 300, protrudes. A relay not shown in the figures can be mounted to the connector 322 for mounting a relay.

An indoor side connector 342a is disposed on the first substrate 340a, and an indoor side connector 342b is disposed on the second substrate 340b. These indoor side connectors 342a, 342b are each electrically connected to a circuit on the indoor side of an automobile through a wire harness not shown in the figures. A connector 343 for mounting a relay is disposed on the second substrate 340b. In the example shown in the figures, three relays can be loaded to the connector 343 for mounting a relay. An engine room side connector 344 is disposed on the third substrate 340c. This engine room side connector 344 is to be electrically connected to a circuit on the engine room side through a wire harness not shown in the figures.

In this way, the case 320 and connectors 322, 341 to 344 of the connection box 300 are formed using the polyolefin resin composite material, and therefore weight reduction and high strengthening can be achieved, and recyclability and surface smoothness can be improved.

The method of producing the connection box and the connector is not particularly limited, and the connection box and the connector can be molded by injection molding of injecting the polyolefin resin composite material into a metal mold. It is to be noted that the connector in the present disclosure includes a connector housing, the connector itself, a connector integrated with a connection box case, and the like.

Examples of the uses of the connection box and the connector include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Pulley>

Figure 7:
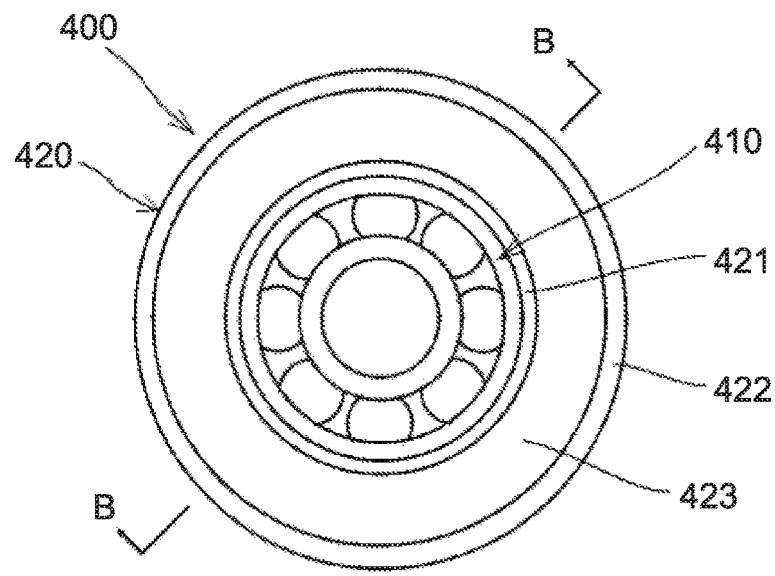
FIG. 7 is a front diagram showing an example of a pulley according to an embodiment of a molded article of the present disclosure.
Figure 8:
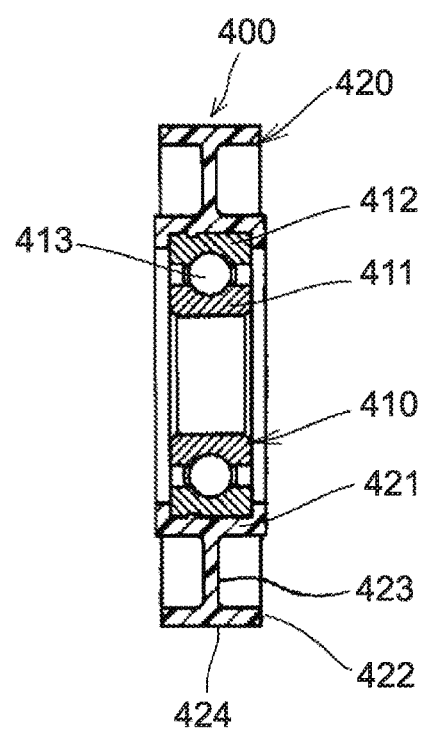
FIG. 8 is a sectional diagram of the pulley shown in FIG. 7, the sectional diagram taken along the line B-B in FIG. 7.

FIG. 7 shows a front diagram of a pulley according to an embodiment of the molded article, and FIG. 8 shows a sectional diagram of FIG. 7, the sectional diagram taken along the line B-B in FIG. 7. As shown in FIG. 7 and FIG. 8, a pulley 400 is formed by a rolling bearing 410 and a resin part 420 integrally molded around the rolling bearing 410. The rolling bearing 410 includes an inner ring 411, an outer ring 412, and a rolling element 413 provided between the inner and outer rings. The resin part 420 is formed using the polyolefin resin composite material. The resin part 420 is provided with a cylindrical boss 421, a cylindrical rim 422, and an annular part 423 that connects the boss 421 and the rim 422. The outer peripheral surface 424 of the rim 422 is a guide surface of a belt not shown in the figures.

FIG. 7 shows an example where the resin part 420 is formed using the polyolefin resin composite material, but the whole pulley may be formed using the polyolefin resin composite material. This can contribute to weight reduction and high strengthening of the pulley 400. The method of producing the pulley 400 is not particularly limited, but the pulley 400 can be molded by injection molding of disposing the rolling bearing 410 in a metal mold and injecting the polyolefin resin composite material into the metal mold. Thereby, the resistance against wear of a metal mold and the smoothness of the edge (sharp-edge characteristic) of the resin part 420 can be improved. In addition, by performing injection molding using the polyolefin resin composite material, a pulley 400 which is reduced in weight and highly strengthened and is excellent in recyclability, surface smoothness, and further, size accuracy can be molded.

Examples of the use of the pulley include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Film for House>

Figure 9:
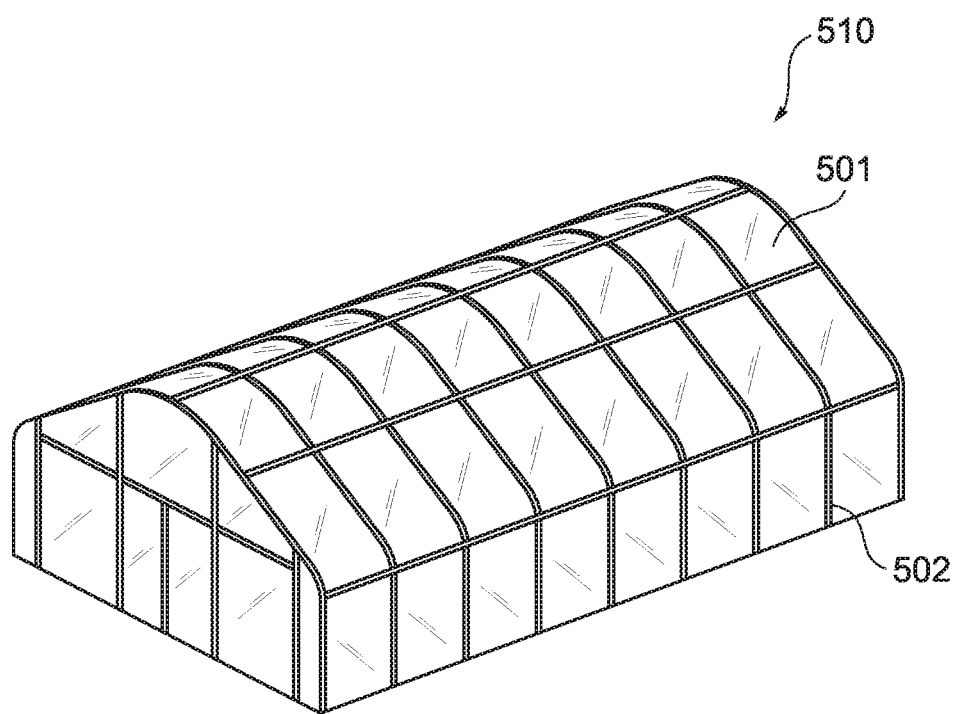
FIG. 9 is a perspective diagram showing an example of a house for agriculture using a film for a house according to an embodiment of a molded article of the present disclosure.
Figure 10A:
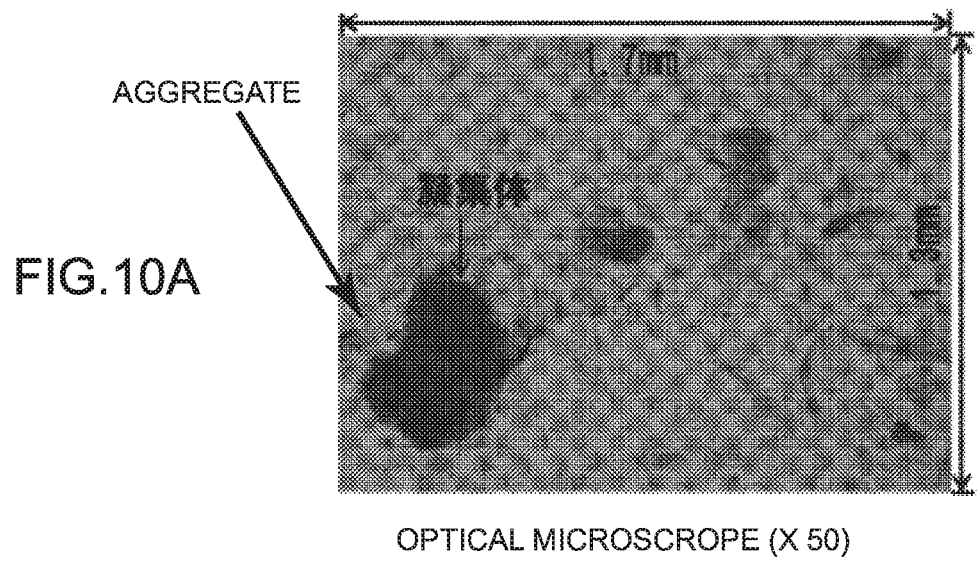
FIG. 10A is an image of a pellet of a polyolefin resin composite material obtained in Comparative Example 1, the image taken according to the procedure described in Method of Calculating Area of Aggregate of Cellulose, which will be described later.
Figure 10B:
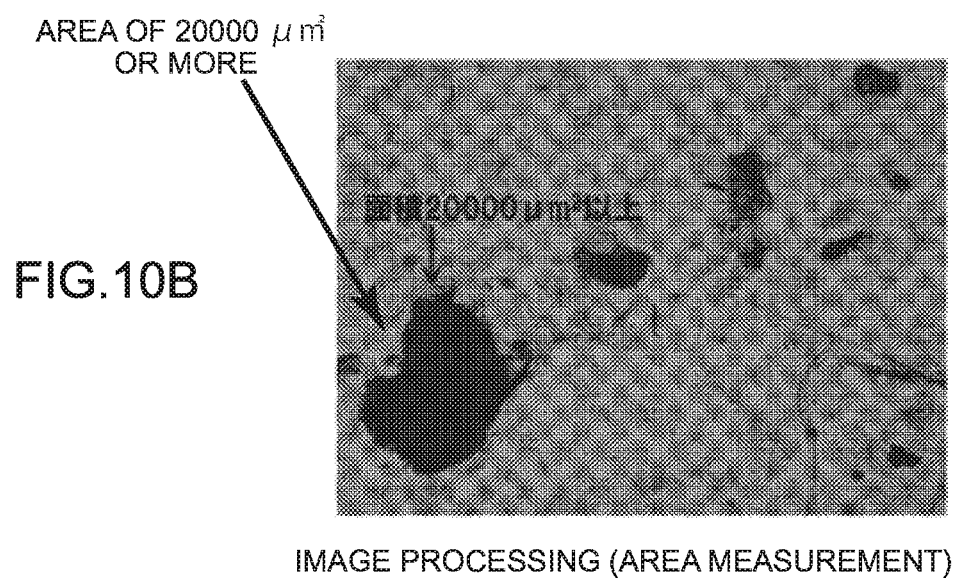
FIG. 10B is an image in which an area was measured by performing image processing.
Figure 10C:
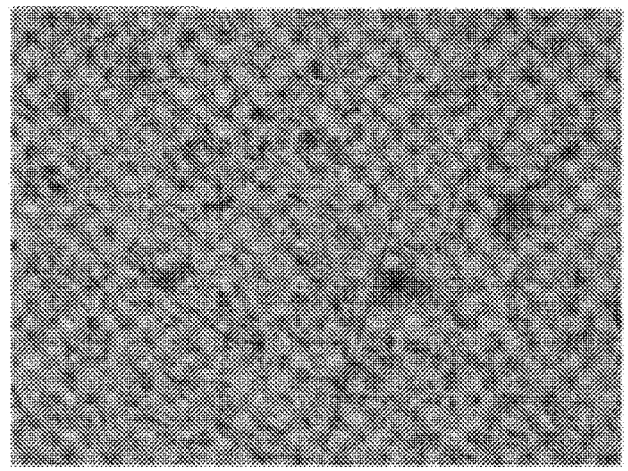
FIG. 10C is an image of a pellet of a polyolefin resin composite material obtained in Example 1, the image taken according to the procedure described in Method of Calculating Area of Aggregate of Cellulose, which will be described later.
Figure 10D:
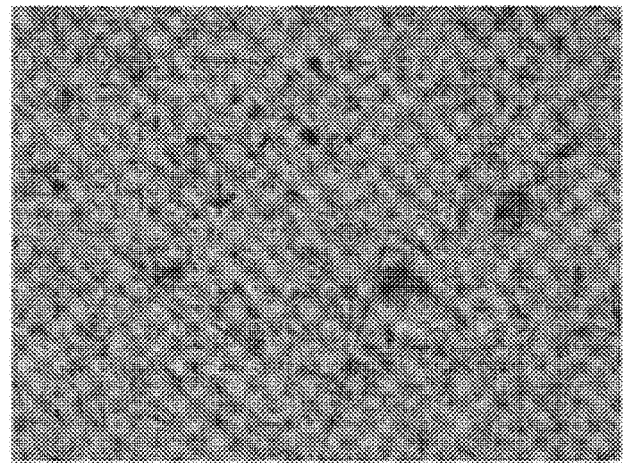
FIG. 10D is an image in which an area was measured by performing image processing in "Method of Calculating Area of Aggregate of Cellulose" described in Example.

FIG. 9 is a schematic perspective diagram showing an example of an appearance of an agricultural house to which a film for a house according to an aspect of the molded article is applied. As shown in FIG. 9, a house 510 for agriculture is provided with a film 501 stretched over a skeleton 502.

As shown in FIG. 9, the whole surface of the house 510 for agriculture is covered with the film 501 stretched over the skeleton 502. When the film 501 is stretched over the skeleton, the house for agriculture in which a space separated from the outside is thereby formed can be made.

The material forming the skeleton 502 is not particularly limited, and a conventionally known aggregate (such as, for example, steel material and steel pipe) for use in a plastic greenhouse can be used. The film 501 is a film to be stretched over the skeleton 502, and the above-described film for a house is applied to the film 501.

The house 510 for agriculture may be provided with ventilation means (not shown in the figure), such as, for example, a ventilation fan, to be provided at the ceiling or the side of a house. In addition, it is preferable that the doorway (not shown in the figure) for a worker who is engaged in work in the house 510 for agriculture be, for example, double-entry doors or the like such that the air outside cannot directly get into the space in the house.

The film 501 in the house 510 for agriculture includes a layer which is formed using the polyolefin resin composite material. Thereby, the film 501 possesses recyclability together with weight reduction and high strengthening, and further, the surface smoothness and the adhesion performance can be improved more than a conventional film.

The film 501 (film for a house) may include a layer which is formed from the polyolefin resin composite material and can be produced by a known method, such as, for example, an inflation molding method, a T-die molding method, a lamination method, and a calender method.

The film 501 (film for a house) may be a single-layered or multi-layered film including one layer or a plurality of layers which is or are formed using the polyolefin resin composite material, or a laminated film in which on a layer formed from the polyolefin resin composite material, a resin layer formed from another resin is laminated. Examples of the resin capable of forming the other resin layer which can be laminated on the layer formed from the polyolefin resin composite material include a polyolefin resin which is usually used for a use as a film for a house.

The thickness of the layer which is formed from the polyolefin resin composite material, the layer included in the film 501 (film for a house) is, for example, 50 μm or more and 200 μm or less, the lower limit value is preferably 75 μm or less, and it is preferable that the upper limit value be 150 μm or less. When the film for a house is a multi-layered film, the thickness of the film for a house can appropriately be set according to the use or the like.

FIG. 9 shows an example of a case where the film 501 (film for a house) is applied to the whole surface of the house 510 for agriculture, but the house 510 for agriculture is not limited to this and may be such that the film for a house is used in some of the surfaces of the house 510 for agriculture. In addition, the house 510 for agriculture can be prepared in such a way that a framework is built in desired width, depth, and height, and the film 501 (film for a house) obtained using the above-described polyolefin resin composite material is stretched over the skeleton 502. Thereby, a house 510 for agriculture which is reduced in weight and highly strengthened and is excellent in recyclability can be obtained.

Examples of the use of the film for a house include a house for gardening, a house for raising a living thing, a house for a terrace, and a simple warehouse, not limited to a house for agriculture, the house for cultivating plants.

EXAMPLES

Hereinafter, the present disclosure will be described in more detail based on Examples, but the present disclosure is not limited to these Examples.

—Materials Used—

The materials used are shown below.

(1) Polyolefin Resin

High density polyethylene [MFR=5 g/10 min (190° C./2.16 kg), density=0.953 g/cm$^3$]

Polypropylene [MFR=9 g/10 min (230° C./2.16 kg), density=0.900 g/cm$^3$]

(2) Cellulose

Cellulose A: KC FLOCK W-200 [trade name, manufactured by Nippon Paper Industries Co., Ltd., powdered cellulose having an average particle diameter of about 32 μm]

Cellulose B: LIGNOCEL C-120 [trade name, manufactured by J. RETTENMAIER & SOHNE GmbH+Co KG, average particle diameter of 70 to 150 μm]

Example 1

A polyolefin resin composite material was prepared by the following step.

1) Step of Preparing Polyolefin Resin Composite Material

A polyolefin resin composite material was prepared in such a way that while the polyolefin resin was being fed to a twin-screw extruder [KZW15TW-45MG-NH (trade name) manufactured by TECHNOVEL CORPORATION] at an outlet temperature of 190° C. and at a rate of 1000 g/hour, the cellulose A was fed by the second feeder at a rate of 110 g/hour, and water was fed by a liquid addition pump at a rate of 98 g/hour, and a mixture satisfying the composition in Table 1 described below was melt-kneaded at 200° C. and was then extruded. The number of rotations of screws was set to 100 rpm.

2) Step of Producing Lamp Body

A lamp body provided with a resin part was prepared by performing injection molding using the polyolefin resin composite material prepared in 1). It is to be noted that with respect to injection conditions, injection molding was carried out under the molding conditions which are generally regarded as suitable in injection molding of a lamp body.

Examples 2 to 14 and Comparative Examples 1 to 3

Polyolefin resin composite materials of Examples 2 to 14 and Comparative Examples 1 to 3 were prepared in the same manner as in Example 1, except that the compositions in the Table 1 described below were adopted. Thereafter, lamp bodies each provided with a resin part were prepared using these polyolefin resin composite materials in the same manner as in Example 1. It is to be noted that in Comparative Example 3, the compounded amount of water was too large, and therefore the discharge amount of the extruder was made unstable.

Example 15

A polyolefin resin composite material was prepared by performing the step of 1) in Example 1 in the same manner as in Example 1.
3) Step of Producing Speaker Unit
Injection molding was performed using the polyolefin resin composite material prepared above to prepare a speaker unit provided with a resin part. It is to be noted that with respect to injection conditions, injection molding was carried out under the molding conditions which are generally regarded as suitable in injection molding of a speaker unit.

Examples 16 to 28 and Comparative Examples 4 to 6

Speaker units each provided with a resin part were each prepared using each of the polyolefin resin composite materials produced in Examples 2 to 14 and Comparative Examples 1 to 3 in the same manner as in Example 15.

Example 29

A polyolefin resin composite material was prepared by performing the step of 1) in Example 1 in the same manner as in Example 1.
4) Step of Producing Connection Box and Connector
Injection molding was performed using the polyolefin resin composite material prepared above to prepare a connection box and a connector each provided with a resin part. It is to be noted that with respect to injection conditions, injection molding was carried out under the molding conditions which are generally regarded as suitable in injection molding of a connection box and a connector.

Examples 30 to 42 and Comparative Examples 7 to 9

Connection boxes and connectors each provided with a resin part were each prepared using each of the polyolefin resin composite materials produced in Examples 2 to 14 and Comparative Examples 1 to 3 in the same manner as in Example 29.

Example 43

A polyolefin resin composite material was prepared by performing the step of 1) in Example 1 in the same manner as in Example 1.
5) Step of Producing Pulley
Injection molding was performed using the polyolefin resin composite material prepared above to prepare a pulley provided with a resin part. It is to be noted that with respect to injection conditions, injection molding was carried out under the molding conditions which are generally regarded as suitable in injection molding of a pulley.

Examples 44 to 56 and Comparative Examples 10 to 12

Pulleys each provided with a resin part were each prepared using each of the polyolefin resin composite materials produced in Examples 2 to 14 and Comparative Examples 1 to 3 in the same manner as in Example 43.

Example 57

A polyolefin resin composite material was prepared by performing the step of 1) in Example 1 in the same manner as in Example 1.
6) Step of Producing Film for House
A single-layered film having a thickness of 100 m was prepared to obtain a film for a house by molding the polyolefin resin composite material prepared above into a film using a T-die cast film production apparatus at an extruding temperature of 200° C.

Examples 58 to 70, Comparative Examples 13 to 15

Films for a house each provided with a resin part were each prepared using each of the polyolefin resin composite materials produced in Examples 2 to 14 and Comparative Examples 1 to 3 in the same manner as in Example 57.

The area of an aggregate of cellulose in the polyolefin resin composite materials forming the resin parts of the lamp bodies, the speaker units, the connection boxes and the connectors, the pulleys, and the films for a house in Examples and Comparative Examples prepared in the manner as described above was calculated in the following manner.

(Method of Calculating Area of Aggregate of Cellulose)
The obtained polyolefin resin composite materials were each made into a pellet of a rectangular parallelepiped of 3.3 mm in length×4.3 mm in breadth×3.6 mm in thickness. A sheet for measurement, having a thickness of 0.1 mm, was prepared using this pellet. Specifically, the pellet was preheated at 160° C. for 5 minutes and then pressurized under a pressure of 20 MPa further at 160° C. for 5 minutes using a press apparatus to prepare a sheet for measurement. Planar view of the prepared sheet was observed at 50-fold magnification with a microscope for industrial use "ECLIPSE LV100ND (trade name)" manufactured by NICON CORPORATION, and an image of this observed face was taken and was subjected to image processing to calculate the area defining a part counted as having a brightness of 0 to 80 to be an aggregate of cellulose. Specifically, a visual field was set to 1.3 mm×1.7 mm, and images of 9 visual fields were randomly taken. The obtained images were subjected to image processing under the conditions described below with "NIS-Elements D (trade name)" manufactured by NIKON CORPORATION to measure each area of the parts counted as having a brightness of 0 to 80. The maximum/the minimum in areas among the parts were defined as the maximum value/the minimum value of the aggregates of cellulose respectively. However, the parts where the minimum value of the areas was less than 500 µm$^2$ were excluded from the objects of measurement. Because when cellulose which is used as a raw material and does not aggregate was measured by the same method as described above, the area was about 500 µm$^2$, and therefore the parts the area of which are equal to or less than this are not recognized as the parts formed in such a way that the cellulose aggregates.

—Image Processing Conditions—
Smooth Off
A function of acting on the shape of an end of an object to smooth the shape.
Clean on
A function by which small objects cannot be seen. The small objects only disappear, and other images are not affected. In the present measurement, areas of less than 500 μm$^2$ are excluded, and therefore objects of less than 500 μm$^2$ have been removed by the dean function.
Filling Up Dosed Region Off
A function of filling up closed regions in an object.
Separation Off
A function of detecting and separating single objects bonded.
Obtained results are shown together in Tables 1 to 5 below.
In addition, an image taken according to the above-described method and an image in which the image processing was performed to measure the areas are each shown in FIGS. 10A to 10D for the pellets of the polyolefin resin composite materials obtained in Comparative Example 1 and Example 1 as representatives.

(Modulus of Elongation)
The pellets of the polyolefin resin composite materials obtained above were dried at 80° C. for 24 hours, and test specimens for a tensile test of the polyolefin resin composite materials forming resin parts of the lamp bodies, the speaker units, the connection boxes and the connectors, the pulleys, and the films for a house were prepared in accordance with the test specimen Type 2 in JIS K7127 with an injection molding machine (RobotShot α-30C manufactured by FANUC CORPORATION). The modulus of elongation (GPa) of the prepared test specimens for a tensile test was measured in accordance with JIS K7161 under a condition of test speed: 1.0 mm/min with a tensile tester (Instron tester 5567 manufactured by Instron).

Obtained results are shown together in Tables 1 to 5 below.

TABLE 1

| Composition | | Example 1 | Example 2 | Example 3 | Example 4 | Example 5 | Example 6 | Example 7 | Example 8 | Example 9 |
|---|---|---|---|---|---|---|---|---|---|---|
| High density polyethylene | | 100 | 100 | 100 | 100 | 100 | 100 | 100 | 100 | 100 |
| Polypropylene | | | | | | | | | | |
| Cellulose | A | 10 | 10 | 10 | 10 | 10 | 10 | 25 | 50 | 75 |
| | B | — | — | — | — | — | — | — | — | — |
| Water | | 15 | 10 | 8.2 | 6.2 | 3.6 | 0.1 | 25 | 50 | 75 |
| Areas of aggregates (μm$^2$) | Maximum value | 10,619 | 11,880 | 12,881 | 12,987 | 13,584 | 18,039 | 10,171 | 10,553 | 11,071 |
| | Minimum value | 503 | 506 | 502 | 502 | 505 | 503 | 502 | 503 | 501 |
| Modulus of elongation (GPa) | | 1.34 | 1.32 | 1.3 | 1.29 | 1.27 | 1.25 | 1.68 | 2.14 | 2.71 |

| Composition | | Example 10 | Example 11 | Example 12 | Example 13 | Example 14 | Comparative Example 1 | Comparative Example 2 | Comparative Example 3 |
|---|---|---|---|---|---|---|---|---|---|
| High density polyethylene | | 100 | 100 | 100 | 100 | — | 100 | 100 | 100 |
| Polypropylene | | | | | | 100 | | | |
| Cellulose | A | 150 | 150 | 150 | — | 10 | 10 | 200 | 100 |
| | B | — | — | — | 10 | — | — | — | — |
| Water | | 1.5 | 150 | 225 | 10 | 15 | — | 100 | 250 |
| Areas of aggregates (μm$^2$) | Maximum value | 18,814 | 12,113 | 10,991 | 11,230 | 10,312 | 144,374 | 23,411 | — |
| | Minimum value | 502 | 502 | 503 | 501 | 503 | 504 | 502 | — |
| Modulus of elongation (GPa) | | 4.12 | 4.39 | 4.42 | 1.33 | 1.98 | 1.18 | 1.21 | — |

TABLE 2

| Composition | | Example 15 | Example 16 | Example 17 | Example 18 | Example 19 | Example 20 | Example 21 | Example 22 | Example 23 |
|---|---|---|---|---|---|---|---|---|---|---|
| High density polyethylene | | 100 | 100 | 100 | 100 | 100 | 100 | 100 | 100 | 100 |
| Polypropylene | | | | | | | | | | |
| Cellulose | A | 10 | 10 | 10 | 10 | 10 | 10 | 25 | 50 | 75 |
| | B | — | — | — | — | — | — | — | — | — |
| Water | | 15 | 10 | 8.2 | 6.2 | 3.6 | 0.1 | 25 | 50 | 75 |
| Areas of aggregates (μm$^2$) | Maximum value | 10,619 | 11,880 | 12,881 | 12,987 | 13,584 | 18,039 | 10,171 | 10,553 | 11,071 |
| | Minimum value | 503 | 506 | 502 | 502 | 505 | 503 | 502 | 503 | 501 |
| Modulus of elongation (GPa) | | 1.34 | 1.32 | 1.3 | 1.29 | 1.27 | 1.25 | 1.68 | 2.14 | 2.71 |

TABLE 2-continued

| Composition | | Example 24 | Example 25 | Example 26 | Example 27 | Example 28 | Comparative Example 4 | Comparative Example 5 | Comparative Example 6 |
|---|---|---|---|---|---|---|---|---|---|
| High density polyethylene | | 100 | 100 | 100 | 100 | — | 100 | 100 | 100 |
| Polypropylene | | — | — | — | — | 100 | — | — | — |
| Cellulose | A | 150 | 150 | 150 | — | 10 | 10 | 200 | 100 |
|  | B | — | — | — | 10 | — | — | — | — |
| Water | | 1.5 | 150 | 225 | 10 | 15 | — | 100 | 250 |
| Areas of aggregates ($\mu m^2$) | Maximum value | 18,814 | 12,113 | 10,991 | 11,230 | 10,312 | 144,374 | 23,411 | — |
|  | Minimum value | 502 | 502 | 503 | 501 | 503 | 504 | 502 | — |
| Modulus of elongation (GPa) | | 4.12 | 4.39 | 4.42 | 1.33 | 1.98 | 1.18 | 1.21 | — |

TABLE 3

| Composition | | Example 29 | Example 30 | Example 31 | Example 32 | Example 33 | Example 34 | Example 35 | Example 36 | Example 37 |
|---|---|---|---|---|---|---|---|---|---|---|
| High density polyethylene | | 100 | 100 | 100 | 100 | 100 | 100 | 100 | 100 | 100 |
| Polypropylene | | | | | | | | | | |
| Cellulose | A | 10 | 10 | 10 | 10 | 10 | 10 | 25 | 50 | 75 |
|  | B | — | — | — | — | — | — | — | — | — |
| Water | | 15 | 10 | 8.2 | 6.2 | 3.6 | 0.1 | 25 | 50 | 75 |
| Areas of aggregates ($\mu m^2$) | Maximum value | 10,619 | 11,880 | 12,881 | 12,987 | 13,584 | 18,039 | 10,171 | 10,553 | 11,071 |
|  | Minimum value | 503 | 506 | 502 | 502 | 505 | 503 | 502 | 503 | 501 |
| Modulus of elongation (GPa) | | 1.34 | 1.32 | 1.3 | 1.29 | 1.27 | 1.25 | 1.68 | 2.14 | 2.71 |

| Composition | | Example 38 | Example 39 | Example 40 | Example 41 | Example 42 | Comparative Example 7 | Comparative Example 8 | Comparative Example 9 |
|---|---|---|---|---|---|---|---|---|---|
| High density polyethylene | | 100 | 100 | 100 | 100 | — | 100 | 100 | 100 |
| Polypropylene | | — | — | — | — | 100 | — | — | — |
| Cellulose | A | 150 | 150 | 150 | — | 10 | 10 | 200 | 100 |
|  | B | — | — | — | 10 | — | — | — | — |
| Water | | 1.5 | 150 | 225 | 10 | 15 | — | 100 | 250 |
| Areas of aggregates ($\mu m^2$) | Maximum value | 18,814 | 12,113 | 10,991 | 11,230 | 10,312 | 144,374 | 23,411 | — |
|  | Minimum value | 502 | 502 | 503 | 501 | 503 | 504 | 502 | — |
| Modulus of elongation (GPa) | | 4.12 | 4.39 | 4.42 | 1.33 | 1.98 | 1.18 | 1.21 | — |

TABLE 4

| Composition | | Example 43 | Example 44 | Example 45 | Example 46 | Example 47 | Example 48 | Example 49 | Example 50 | Example 51 |
|---|---|---|---|---|---|---|---|---|---|---|
| High density polyethylene | | 100 | 100 | 100 | 100 | 100 | 100 | 100 | 100 | 100 |
| Polypropylene | | | | | | | | | | |
| Cellulose | A | 10 | 10 | 10 | 10 | 10 | 10 | 25 | 50 | 75 |
|  | B | — | — | — | — | — | — | — | — | — |
| Water | | 15 | 10 | 8.2 | 6.2 | 3.6 | 0.1 | 25 | 50 | 75 |
| Areas of aggregates ($\mu m^2$) | Maximum value | 10,619 | 11,880 | 12,881 | 12,987 | 13,584 | 18,039 | 10,171 | 10,553 | 11,071 |
|  | Minimum value | 503 | 506 | 502 | 502 | 505 | 503 | 502 | 503 | 501 |
| Modulus of elongation (GPa) | | 1.34 | 1.32 | 1.3 | 1.29 | 1.27 | 1.25 | 1.68 | 2.14 | 2.71 |

| Composition | | Example 52 | Example 53 | Example 54 | Example 55 | Example 56 | Comparative Example 10 | Comparative Example 11 | Comparative Example 12 |
|---|---|---|---|---|---|---|---|---|---|
| High density polyethylene | | 100 | 100 | 100 | 100 | — | 100 | 100 | 100 |
| Polypropylene | | | | | | 100 | | | |

TABLE 4-continued

| | | | | | | | | | |
|---|---|---|---|---|---|---|---|---|---|
| Cellulose | A | 150 | 150 | 150 | — | 10 | 10 | 200 | 100 |
| | B | — | — | — | 10 | — | — | — | — |
| Water | | 1.5 | 150 | 225 | 10 | 15 | — | 100 | 250 |
| Areas of aggregates ($\mu m^2$) | Maximum value | 18,814 | 12,113 | 10,991 | 11,230 | 10,312 | 144,374 | 23,411 | — |
| | Minimum value | 502 | 502 | 503 | 501 | 503 | 504 | 502 | — |
| Modulus of elongation (GPa) | | 4.12 | 4.39 | 4.42 | 1.33 | 1.98 | 1.18 | 1.21 | — |

TABLE 5

| Composition | | Example 57 | Example 58 | Example 59 | Example 60 | Example 61 | Example 62 | Example 63 | Example 64 | Example 65 |
|---|---|---|---|---|---|---|---|---|---|---|
| High density polyethylene | | 100 | 100 | 100 | 100 | 100 | 100 | 100 | 100 | 100 |
| Polypropylene | | | | | | | | | | |
| Cellulose | A | 10 | 10 | 10 | 10 | 10 | 10 | 25 | 50 | 75 |
| | B | — | — | — | — | — | — | — | — | — |
| Water | | 15 | 10 | 8.2 | 6.2 | 3.6 | 0.1 | 25 | 50 | 75 |
| Areas of aggregates ($\mu m^2$) | Maximum value | 10,619 | 11,880 | 12,881 | 12,987 | 13,584 | 18,039 | 10,171 | 10,553 | 11,071 |
| | Minimum value | 503 | 506 | 502 | 502 | 505 | 503 | 502 | 503 | 501 |
| Modulus of elongation (GPa) | | 1.34 | 1.32 | 1.3 | 1.29 | 1.27 | 1.25 | 1.68 | 2.14 | 2.71 |

| Composition | | Example 66 | Example 67 | Example 68 | Example 69 | Example 70 | Comparative Example 13 | Comparative Example 14 | Comparative Example 15 |
|---|---|---|---|---|---|---|---|---|---|
| High density polyethylene | | 100 | 100 | 100 | 100 | — | 100 | 100 | 100 |
| Polypropylene | | | | | | 100 | | | |
| Cellulose | A | 150 | 150 | 150 | — | 10 | 10 | 200 | 100 |
| | B | — | — | — | 10 | — | — | — | — |
| Water | | 1.5 | 150 | 225 | 10 | 15 | — | 100 | 250 |
| Areas of aggregates ($\mu m^2$) | Maximum value | 18,814 | 12,113 | 10,991 | 11,230 | 10,312 | 144,374 | 23,411 | — |
| | Minimum value | 502 | 502 | 503 | 501 | 503 | 504 | 502 | — |
| Modulus of elongation (GPa) | | 4.12 | 4.39 | 4.42 | 1.33 | 1.98 | 1.18 | 1.21 | — |

In Tables 1 to 5, the contents of the polyolefin resin, the cellulose A, and water are expressed by parts by mass, and the "-" shows that the polyolefin resin, the cellulose A, or water is not used, namely 0 parts by mass. In addition, the "-" in the "Areas of aggregates" in Comparative Examples 3, 6, 9, 12, and 15 means that a composite material in which the cellulose and the polyolefin resin are integrated was not obtained.

From Tables 1 to 5 described above, it is found that in all of the polyolefin resin composite materials forming the resin parts of the lamp bodies, the speaker units, the connection boxes and the connectors, the pulleys, and the films for a house in Examples 1 to 70, the areas of the aggregates of the cellulose are less than 20,000 $\mu m^2$, and the polyolefin resin and the cellulose are integrated with a high degree of uniformity. In addition, all of the polyolefin resin composite materials prepared in Examples 1 to 70 had a modulus of elongation, as mechanical strength, of 1.25 or more and exhibited a higher modulus of elongation than the test specimens for a tensile test of Comparative Examples of 1 to 2, 4 to 5, 7 to 8, 10 to 11, and 13 to 14. As can be seen from this fact, the lamp bodies, the speaker units, the connection boxes and the connectors, the pulleys, and the films for a house each provided with a resin part having an improved mechanical strength can be prepared in Examples 1 to 70 because the polyolefin resin composite materials each having such an action are used.

In contrast, in the polyolefin resin composite materials of Comparative Examples 1, 4, 7, 10, and 13, the areas of the aggregates of the cellulose greatly exceeded 20,000 $\mu m^2$ because water was not used at the time of kneading. In addition, in the polyolefin resin composite materials of Comparative Examples of 2, 5, 8, 11, and 14, the areas of the aggregates exceeded 20,000 $\mu m^2$ because the amount of the cellulose was excessive, 200 parts by mass based on 100 parts by mass of the polyolefin resin. Therefore, a polyolefin resin composite material in which a polyolefin resin and cellulose are integrated with a high degree of uniformity was not able to be obtained in Comparative Examples 1 to 2, 4 to 5, 7 to 8, 10 to 11, and 13 to 14. Further, in the polyolefin resin composite materials of Comparative Examples of 3, 6, 9, 12, and 15, the amount of water was excessive, 250 parts by mass based on 100 parts by mass of the polyolefin resin, and therefore a polyolefin resin composite material in which a polyolefin resin and cellulose are integrated was not able to be obtained.

In this way, it is found that by adding a particular amount of water when particular amounts of a polyolefin resin and cellulose are melt-kneaded, the size of an aggregate of the cellulose can be controlled to less than 20,000 $\mu m^2$, and molded articles, such as a lamp body, a speaker unit, a connection box and a connector, a pulley, and a film for a house, the molded articles each provided with a resin part formed with a resin composite material in which a hydrophobic polyolefin resin and the cellulose are integrated with a high degree of uniformity, the resin part having an improved mechanical strength, are obtained.

In addition, in the polyolefin resin composite materials of Examples 1 to 70, the polyolefin resin and the cellulose are integrated with a high degree of uniformity, and therefore it can be concluded that the molded articles, such as the lamp bodies, the speaker units, the connection boxes and the connectors, the pulleys, and the films for a house, the molded articles each provided with a resin part molded with each of the polyolefin resin composite materials, are reduced in weight and highly strengthened, and the pulleys and the lamp bodies of a lighting appliance which are excellent in size accuracy, the speaker units which are excellent in acoustic characteristics, and the connection boxes, the connectors, and the films for a house which are excellent in recyclability are obtained.

What is claimed is:

1. A molded article made of a resin part formed with a polyolefin resin composite material, the polyolefin resin composite material comprising:
   a polyolefin resin; and
   25 to 150 parts by mass of cellulose based on 100 parts by mass of the polyolefin resin, wherein an area of an aggregate of the cellulose is more than 500 $\mu m^2$ and less than 20,000 $\mu m^2$, wherein the cellulose is integrated with water, and wherein the polyolefin resin composite material has a modulus of elongation of 1.25 GPa or more.

2. The molded article according to claim 1, wherein the cellulose is a plant-derived, fibrous cellulose.

3. The molded article according to claim 1, wherein the polyolefin resin is at least one of a polyethylene resin, a polypropylene resin, and an acrylonitrile/butadiene/styrene copolymer resin.

4. The molded article according to claim 2, wherein the polyolefin resin is at least one of a polyethylene resin, a polypropylene resin, and an acrylonitrile/butadiene/styrene copolymer resin.

5. The molded article according to claim 1, wherein the molded article is a lamp body of a lighting appliance, a speaker unit, a connection box, a connector, a pulley, or a film for a house.

6. The molded article according to claim 2, wherein the molded article is a lamp body of a lighting appliance, a speaker unit, a connection box, a connector, a pulley, or a film for a house.

7. The molded article according to claim 3, wherein the molded article is a lamp body of a lighting appliance, a speaker unit, a connection box, a connector, a pulley, or a film for a house.

8. The molded article according to claim 4, wherein the molded article is a lamp body of a lighting appliance, a speaker unit, a connection box, a connector, a pulley, or a film for a house.

9. The molded article according to claim 1, wherein the polyolefin resin is melt-kneaded with the cellulose in a presence of water.

10. The molded article according to claim 1, wherein an amount of the water is 1 to 225 parts by mass based on 100 parts by mass of the polyolefin resin.

11. The molded article according to claim 1, wherein the area of the aggregate of the cellulose corresponds to a cross-sectional area.

* * * * *